United States Patent [19]
Ina et al.

[11] 4,442,820
[45] Apr. 17, 1984

[54] EXHAUST RECIRCULATION SYSTEM FOR INTERNAL COMBUSTION ENGINES

[75] Inventors: Toshikazu Ina, Aichi; Hisasi Kawai, Toyohashi; Tokio Kohama, Nishio; Akira Nishimatsu, Okazaki; Yasuhiko Ishida, Mishima; Souichi Matsusita, Susono, all of Japan

[73] Assignees: Nippon Soken, Inc., Nishio; Toyota Jidosha Kabushiki Kaisha, Toyota, both of Japan

[21] Appl. No.: 416,696

[22] Filed: Sep. 10, 1982

[30] Foreign Application Priority Data

Sep. 16, 1981 [JP] Japan .................. 56-146877
Sep. 16, 1981 [JP] Japan .................. 56-146878

[51] Int. Cl.³ .......................................... F02M 25/06
[52] U.S. Cl. ........................... 123/571; 123/569; 364/431.06
[58] Field of Search ................ 123/571, 569; 364/431.06

[56] References Cited

U.S. PATENT DOCUMENTS

| | | | |
|---|---|---|---|
| 4,257,382 | 3/1981 | Matsui et al. | 123/571 |
| 4,378,776 | 4/1983 | Nishimori | 123/571 |
| 4,378,777 | 4/1983 | Iida et al. | 123/571 |

FOREIGN PATENT DOCUMENTS

| | | | |
|---|---|---|---|
| 55-93950 | 7/1980 | Japan | 123/571 |
| 56-151252 | 11/1981 | Japan | 123/569 |

*Primary Examiner*—Wendell E. Burns
*Attorney, Agent, or Firm*—Cushman, Darby & Cushman

[57] ABSTRACT

In an exhaust gas recirculation system including a recirculation passage to provide a communication between an intake pipe and an exhaust pipe of an internal combustion engine, a flow control valve associated with a pneumatic servomotor to control the quantity of exhaust gas flowing through the recirculation passage in accordance with the pneumatic pressure applied to the servomotor, and first and second electrically operated valves to selectively apply negative pressure and the atmospheric pressure to the servomotor, a digital computer is adapted to calculate a desired opening degree of the flow control valve in response to an electric signal indicative of operating conditions of the engine, to calculate each energization time of the valves defined by a difference between the actual opening degree of the flow control valve and the calculated value in response to an electric signal indicative of the actual opening degree of the flow control valve, and to generate an output signal indicative of the calculated energization time.

12 Claims, 20 Drawing Figures

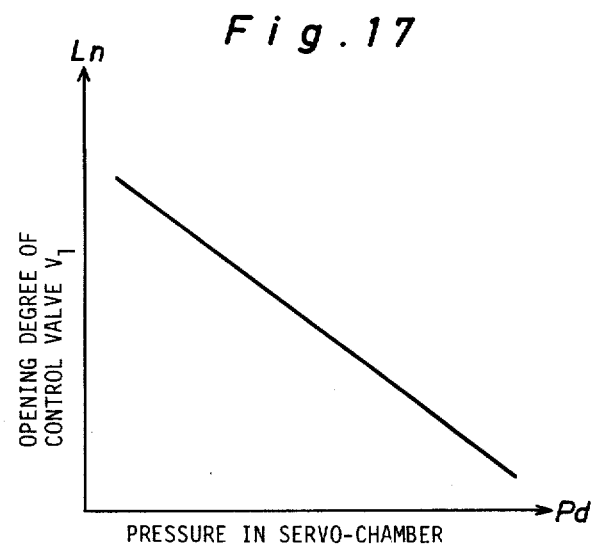
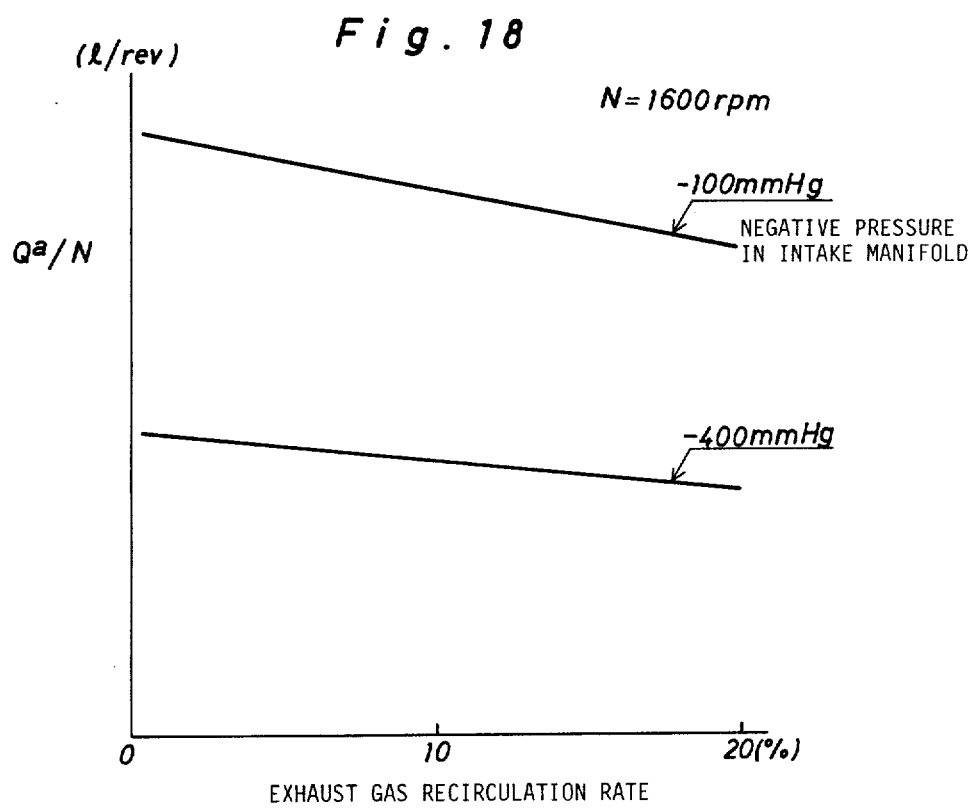

EXHAUST RECIRCULATION SYSTEM FOR INTERNAL COMBUSTION ENGINES

BACKGROUND OF THE INVENTION

The present invention relates to an exhaust gas recirculation system for internal combustion engines, and more particularly to an exhaust gas recirculation system in which the flow quantity of exhaust gas into an intake manifold of the engine is controlled in accordance with operating conditions of the engine to reduce the nitrogen oxide content of exhaust emissions (hereinafter simply called $NO_x$ emissions).

An exhaust gas recirculation system has been proposed of the type which comprises a pneumatically operated servomotor to be operated by negative pressure applied thereto from an intake manifold of the engine, a flow control valve associated with the servomotor to control the flow quantity of exhaust gas through a recirculation pipe in response to operation of the servomotor, and a pair of electrically operated valves for selectively applying the negative pressure and the atmospheric pressure respectively from the intake manifold and the exterior to the servomotor. In such an exhaust gas recirculation system as described above, it is required to control the opening degree of the flow control valve in accordance with operating conditions of the engine as precisely as possible so as to effect recirculation of the exhaust gas in an optimum quantity. Additionally, in use of the system for a long period of time, there will occur clogging or obstruction in the recirculation pipe and/or the flow control valve assembly caused by adherence of the carbon and lead contents or the like in the exhaust gas, resulting in decrease of the exhaust gas recirculation rate. It is, therefore, required to compensate the opening degree of the flow control valve in accordance with the extent of the clogging or obstruction so as to ensure recirculation of the exhaust gas in the optimum quantity.

SUMMARY OF THE INVENTION

Accordingly, the primary object of the present invention is to provide an exhaust gas recirculation system capable of controlling the opening degree of the flow control valve as precisely as possible for effecting recirculation of the exhaust gas in an optimum quantity in accordance with operating conditions of the engine.

Another object of the present invention is to provide an exhaust gas recirculation system capable of compensating the opening degree of the flow control valve in accordance with the extent of clogging or obstruction in the recirculation pipe and/or the flow control valve assembly thereby to ensure recirculation of the exhaust gas in the optimum quantity for a long period of time.

According to the present invention, the primary object is accomplished by provision of an exhaust gas recirculation system which comprises a recirculation passage to provide a communication between an intake pipe and an exhaust pipe of an internal combustion engine, a pneumatic servomotor to be operated by the pressure applied to its servo-chamber, a flow control valve associated with the servo-motor for controlling the quantity of exhaust gas flowing through the recirculation passage in accordance with the level of pneumatic pressure in the servo-chamber of the servomotor, and first and second electrically operated valves to selectively apply negative pressure and the atmospheric pressure respectively from the intake pipe and the exterior to the servo-chamber of the servomotor in energization thereof and to maintain the level of pneumatic pressure in the servo-chamber at an adjusted value during deenergization thereof.

The exhaust gas recirculation system further comprises first detecting means for producing a first electric signal indicative of operating conditions of the engine, second detecting means for producing a second electric signal indicative of the actual opening degree of the flow control valve, computer means to calculate a desired opening degree of the flow control valve in response to the first electric signal for effecting recirculation of the exhaust gas in a desired quantity in accordance with the operating conditions of the engine, to calculate each energization time defined by a difference between the actual opening degree of the flow control valve and the calculated value in response to the second electric signal, and to generate an output signal indicative of the calculated energization time, and means for selectively energizing the valves in response to the output signal from the computer means for the calculated energization time and for deenergizing both the valves upon lapse of the calculated energization time.

It is preferable that the exhaust gas recirculation system further comprises a throttle position sensor for producing an electric signal indicative of the actual opening of a throttle valve of the engine, and the computer means is arranged to memorize each opening degree of the throttle valve related to each negative pressure in the intake pipe and each rotational speed of the engine in relation to the calculated value, the computer means being programmed to discriminate a difference between the memorized negative pressure and the value of the electric signal from the throttle position sensor and to compensate the calculated value in accordance with the discriminated difference.

It is also preferable that the exhaust gas recirculation system further comprises a negative pressure sensor for producing an electric signal indicative of the actual negative pressure in the intake pipe, and the computer means is arranged to memorize each negative pressure in the intake pipe related to each flow quantity of the intake air per one rotation of the engine and each rotational speed of the engine in relation to the calculated value, the computer means being programmed to discriminate a difference between the memorized negative pressure and the value of the electric signal from the negative pressure sensor and to compensate the calculated value in accordance with the discriminated difference.

BRIEF DESCRIPTION OF THE DRAWINGS

Additional objects and advantages of the present invention will be more readily apparent from the following detailed description of preferred embodiments thereof when taken together with the accompanying drawings in which:

FIG. 17 is a graph showing a relationship between the actual opening degree of the flow control valve and the pressure in the servo-chamber of the servomotor shown in FIG. 13;

FIG. 18 is a graph showing a relationship between the quantity of the intake air per one rotation of the engine and the exhaust gas recirculation rate in consideration with negative pressures in the intake manifold;

DETAILED DESCRIPTION OF THE PREFERRED EMBODIMENTS

Figure 1:
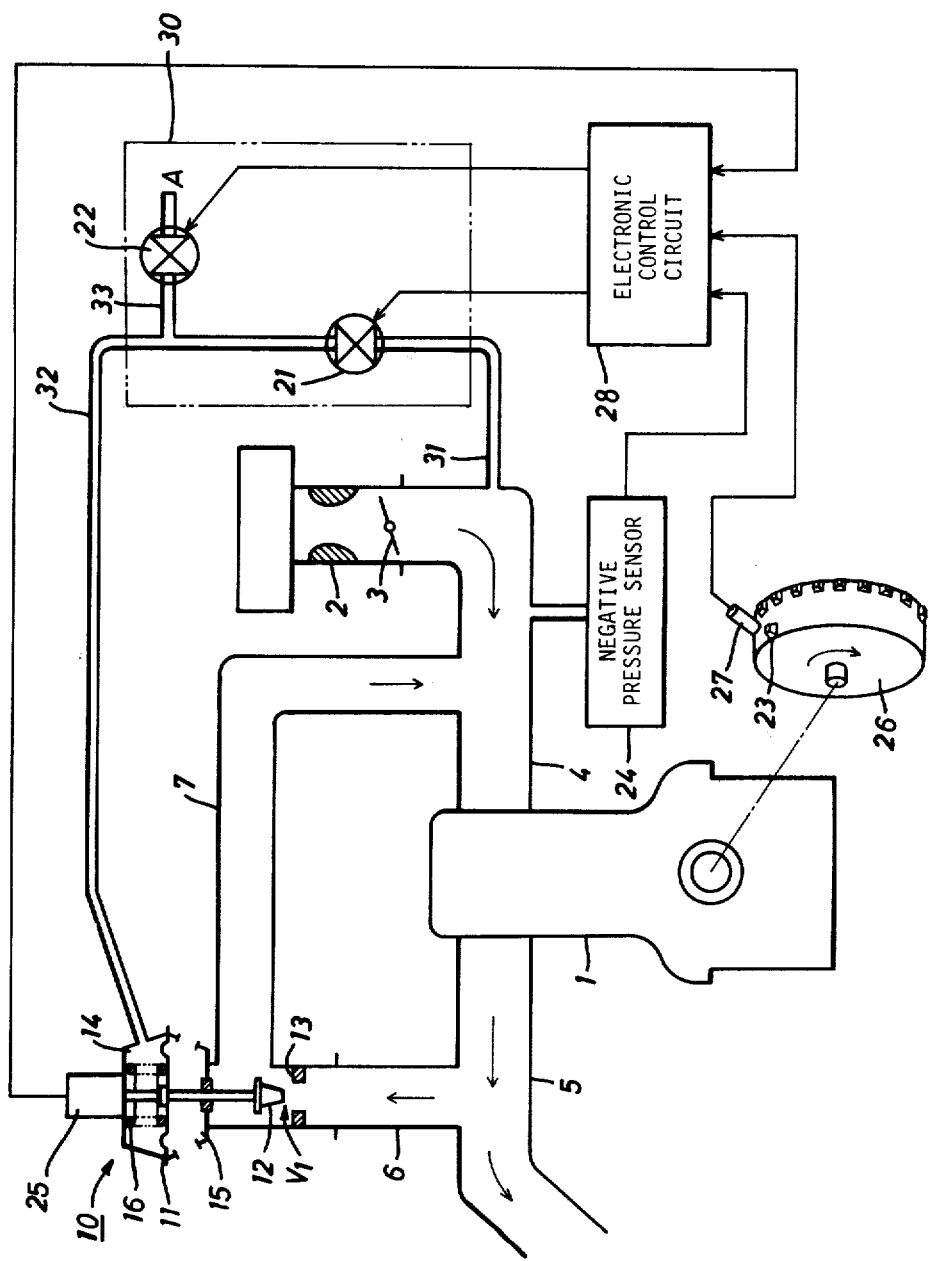
FIG. 1 is a schematic block diagram of an exhaust gas recirculation system for an internal combustion engine in accordance with the present invention.

Referring now to FIG. 1 of the drawings, there is schematically illustrated an exhaust gas recirculation system (hereinafter simply called EGR system) for an internal combustion engine 1 in accordance with the present invention. The engine 1 is of a conventional four cylinder four stroke type and comprises intake and exhaust manifolds 4 and 5. A carburetor 2 for engine 1 is also of a conventional type and serves to receive fresh air from an air filter mounted thereon. The fresh air is mixed with fuel at a venturi of carburetor 2 and is sucked into a combustion chamber of engine 1 through a throttle valve 3. The exhaust gas after combustion is discharged into the exhaust manifold 5 and exhaused into the atmosphere through a catalytic converter and a muffler (not shown).

In the EGR system, recirculation pipes 6 and 7 are provided to lead the exhaust manifold 5 to intake manifold 4 to recirculate the exhaust gas therethrough. The EGR system comprises a servomotor 10 to be operated by pneumatic pressure applied thereto, and a flow control valve $V_1$ associated with the servomotor 10 to control the quantity of exhaust gas flowing through pipes 6, 7 in accordance with the pneumatic pressure applied to servomotor 10. The servomotor 10 includes a diaphragm member 11 assembled within a housing to form a servo-chamber 14 and an atmospheric chamber 15. The diaphragm member 11 includes a rod centrally fixed thereto and is biased by a compression spring 16 toward the atmospheric chamber 15. The servo-chamber 14 is connected to first and second electromagnetically operated valves 21 and 22 through a conduit 32, while the atmospheric chamber 15 is vented. The flow control valve $V_1$ is in the form of a variable throttle valve which includes a valve seat 13 secured to the inner wall of pipe 6 and a valve member 12 fixed to the rod of diaphragm member 11 to cooperate with valve seat 13. The opening degree of control valve $V_1$ is controlled by the biasing force of spring 16 and a difference in pressure between chambers 15 and 14. In operation, the opening degree of control valve $V_1$ decreases in accordance with increase of the pneumatic pressure in servo-chamber 14 and increases in accordance with decrease of the pneumatic pressure in servo-chamber 14. For the purpose of detecting the actual opening degree of control valve $V_1$, a valve position sensor 25 is provided on the housing of servomotor 10 in the form of a potentiometer which acts to detect the valve position of control valve $V_1$.

The EGR system further comprises a pneumatic pressure control mechanism 30 in which an electronic control circuit 28 is provided to control operation of the first and second electromagnetically operated valves 21, 22 in response to electric signals from the valve position sensor 25, a negative pressure sensor 24 and a rotational speed sensor 27. The first electromagnetically operated valve 21 is of a normally closed type and is connected at its inlet port to the downstream of throttle valve 3 through a conduit 31 and at its outlet port to the servo-chamber 14 of servomotor 10 through conduit 32. When energized in response to an output signal from control circuit 28, the first electromagnetically operated valve 21 opens to apply the negative pressure from intake manifold 4 to the servo-chamber 14 of servomotor 10. The second electromagnetically operated valve 22 is also of a normally closed type and is connected at its inlet port to the atmosphere and at its outlet port to the servo-chamber 14 of servomotor 10 through conduits 32 and 33. When energized in response to an output signal from control circuit 28, as described later in detail, the second electromagnetically operated valve 22 opens to apply the atmospheric pressure to the servo-chamber 14 of servomotor 10 through conduits 33, 32.

The electronic control circuit 28 is arranged to calculate a value indicative of optimum recirculation quantity of the exhaust gas in accordance with operating conditions of the engine and to compare the calculated optimum value with a value of an input signal from valve position sensor 25 so as to adjust the pneumatic pressure in servo-chamber 14 of servomotor 10 in such a way to direct the value of the input signal from valve position sensor 25 toward the calculated optimum value. For the purpose of effecting such function of the electronic control circuit 28, the negative pressure sensor 24 is provided on intake manifold 4 to detect a negative pressure in intake manifold 4 and to produce therefrom an electric signal indicative of the negative pressure to be applied as an input signal to the control circuit 28. The rotational speed sensor 27 is in the form of a magnetic pickup transducer which is located in magnetic coupling relationship with a projection 23 of a ring gear 26. The ring gear 26 is operatively connected to a crankshaft of engine 1 to rotate once at one crankshaft rotation. When the crankshaft rotates, the transducer 27 detects the angular position of projection 23 at each rotation of ring gear 26 to produce therefrom an electric signal indicative of the rotational speed of engine 1. In this embodiment, an engine sensor for detecting operating condition of engine 1 is composed of the negative pressure sensor 24 and the rotational speed sensor 27.

Figure 2:
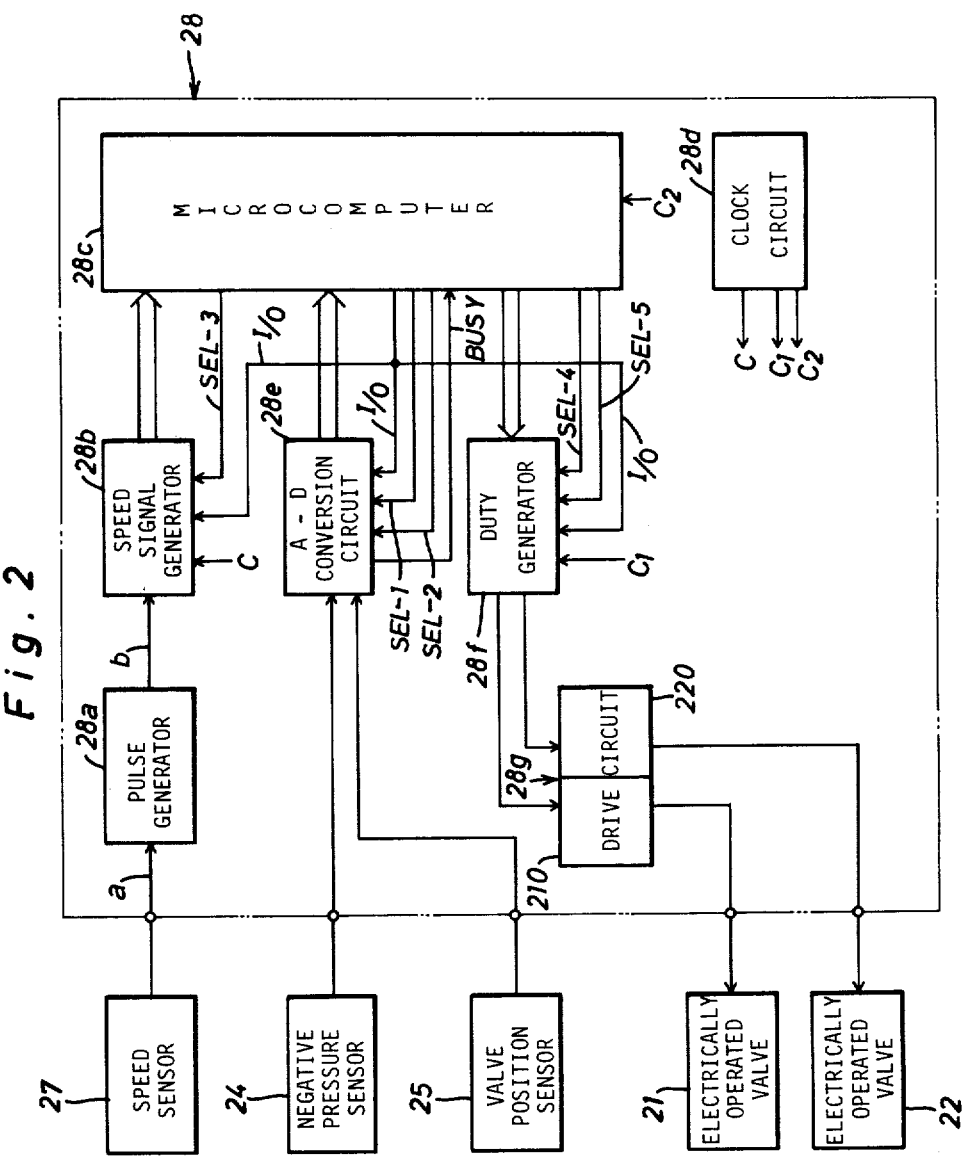
FIG. 2 is a circuit diagram of the electronic control circuit shown in block form in FIG. 1.
Figure 4:
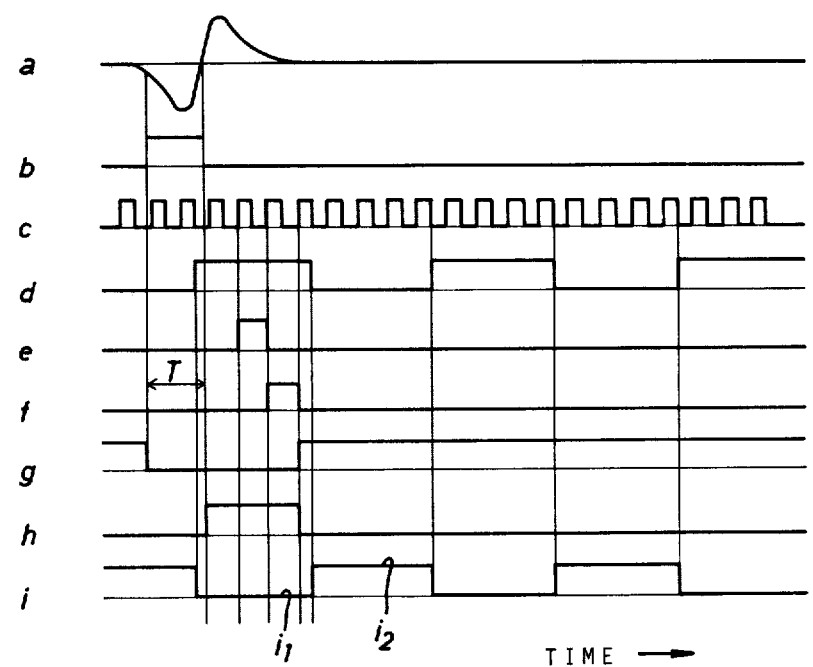
FIG. 4 illustrates waveforms obtained at various points in the circuit diagrams of FIGS. 2 and 3.

As shown in FIG. 2, the electronic control circuit 28 comprises a pulse generator 28a which is provided to reshape the electric signal a from speed sensor 27 into a square wave form pulse signal b, as shown in FIG. 4. The pulse signal b has a pulse-width and a period of time corresponding with rotational speed of engine 1. A clock circuit 28d is a conventional crystal oscillator which serves to generate a series of clock pulses c at a predetermined frequency, as shown in FIG. 4. A speed signal generator 28b is coupled with pulse generator 28a and clock circuit 28d to calculate the period of time of the pulse signal b in accordance with the clock pulses c. Then, the calculated resultant value is latched in speed signal generator 28b and applied as a binary signal to a bus line of a digital computer 28c in response to an input-output or I/0 signal and a third device-select or SEL-3 signal from computer 28c. An analog-to-digital conversion circuit 28e is operated by an output request signal from computer 28c to convert input analog signals from negative pressure sensor 24 and valve position sensor 25 into binary signals in response to the I/0 signal, and first and second device-select or SEL-1 and SEL-2 signals from computer 28c. The binary signals from circuit 28e are applied to the computer 28c through the bus line.

The digital computer 28c is a commercially available computer of TKCS-12A type manufactured by Tokyo Shibaura Electric Co., Ltd. in Japan. The digital computer 28c comprises a central processing unit or CPU, a memory having a read-only memory and a randam access memory in connection with CPU through the bus line, and a device control unit or DCU. A predetermined program is previously stored in the memory of computer 28c to calculate an optimum recirculation quantity of the exhaust gas in accordance with the actual rotational speed of engine 1 and the actual negative pressure in intake manifold 4 by using the binary signals from speed signal generator 28b and analog-to-digital conversion circuit 28e, to determine an optimum opening degree of control valve $V_1$ for effecting recirculation of the exhaust gas in the calculated optimum quantity, and to determine energization time of the respective electromagnetically operated valves 21, 22 necessary for adjusting the actual opening degree of control valve $V_1$ to the optimum value. Further detailed description regarding the digital computer is abbreviated because the particular construction and programming process is well known in the prior arts. In the electronic control circuit 28, a duty generator 28f is coupled with computer 28c to convert output binary signals indicative of energization time of valves 21, 22 from computer 28c into pulse signals having a pulse width corresponding with the energization time. The pulse signals from duty generator 28f are applied to a drive circuit 28g which acts to control energization of the valves 21, 22 in accordance with each pulse width of pulse signals from duty generator 28f so as to adjust the opening degree of control valve $V_1$ to the optimum value.

Figure 3:
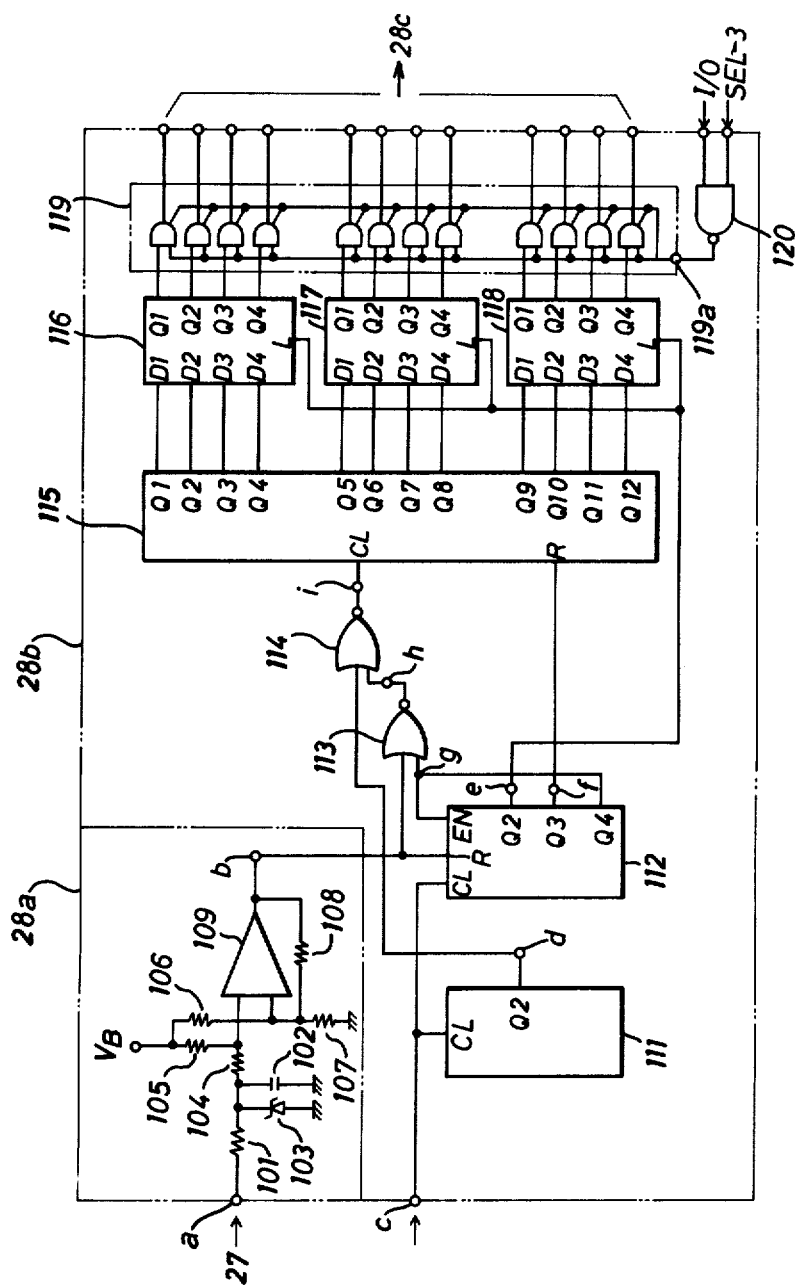
FIG. 3 is each circuit diagram of the pulse generator and the speed signal generator shown in block form in FIG. 2.

In FIG. 3, there is illustrated a preferred embodiment of pulse generator 28a and speed signal generator 28b. The pulse generator 28a comprises a low-pass filter including a resistor 101, a condensor 102 and a zener diode 103 for voltage clamp and further comprises a comparison circuit including resistors 104, 105, 106, 107, 108 and a comparator 109. The comparator 109 is applied at its inversion input terminal with a bias direct current voltage $V_B$ through resistor 105 and is applied at its non-inversion input terminal with a bias voltage divided by resistors 106, 107. The feedback resistor 108 is coupled with comparator 109 to sharply form the leading and trailing edges of an output pulse from pulse generator 28a. In such arrangement, the comparator 109 acts to generate a square wave form pulse signal b in response to an input signal from transducer 27, as shown in FIG. 4.

The speed signal generator 28b comprises a binary counter 111 having a clock terminal CL for receiving clock pulses c at a frequency of about 128 KHz from clock circuit 28d. The binary counter 111 is of CD 4024 type manufactured by RCA Corporation in U.S.A. and serves to generate an electric signal of about 32 KHz at its output terminal $Q_2$ in accordance with clock pulses c, as shown by the reference character d in FIG. 4. The electric signal d is applied to a NOR-gate 114. The speed signal generator 28b also comprises a decade counter 112 which has a reset terminal R for receiving the pulse signal b from pulse generator 28a and a clock terminal CL for receiving the clock pulses c from clock circuit 28d. The decade counter 112 is reset in response to the pulse signal b and starts to count the clock pulses c at a trailing edge of the pulse signal b. Then, the counter 112 generates high level signals e, f and g in sequence at its output terminals $Q_2$, $Q_3$ and $Q_4$, as shown in FIG. 4. The high level signal e is applied to shift registers 116, 117 and 118, and the high level signal f is applied to a binary counter 115. The high level signal g is applied to a NOR-gate 113 and to an inhibit terminal EN of counter 112 to inhibit the counting operation.

The NOR-gate 113 has input terminals for respectively receiving the high level signal g from counter 112 and the pulse signal b from pulse generator 28a. When the signals g and b are at a low level respectively, NOR-gate 113 generates a high level signal h therefrom, as shown in FIG. 4. NOR-gate 114 has input terminals for respectively receiving the electric signal d from counter 111 and the high level signal h from NOR-gate 113. When received a high level signal from either one of counter 111 and NOR-gate 113, NOR-gate 114 generates a low level signal $i_1$ therefrom. When received low level signals d and h from counter 111 and NOR-gate 113, NOR-gate 114 generates a high level signal $i_2$ therefrom. The low and high level signals $i_1$, $i_2$ are alternatively applied to a clock terminal CL of binary counter 115.

The binary counter 115 is reset in response to a high level signal f from decade counter 112 and starts to count a series of high level signals $i_2$ from NOR-gate 114 at a trailing edge of the high level signal f. The counting operation is completed at a trailing edge of an electric pulse signal b which will be generated from pulse generator 28a after generation of the high level signal f. In other words, the counting operation of binary counter 115 starts at the trailing edge of the high level signal f and is completed at the leading edge of a high level signal h which will be generated from NOR-gate 113 after generation of the high level signal f. As a result, the binary counter 115 generates output signals respectively at its terminals $Q_1$ to $Q_{12}$ as an electric binary signal indicative of the period of time T of the pulse signal b, the period of time T being proportional to a reciprocal of rotational speed N of engine 1.

The shift registers 116, 117 and 118 are respectively of CD 4035 type manufactured by RCA Corporation. The shift register 116 has a latch terminal L for receiving the electric signal e from decade counter 112 and input terminals $D_1$ to $D_4$ for respectively receiving the output signals from the terminals $Q_1$ to $Q_4$ of binary counter 115. When the electric signal e appears at the output terminal $Q_2$ of decade counter 112, the register 116 latches therein the output signals from binary counter 115 which are previously counted prior to generation of the electric signal e. The remaining shift registers 117 and 118 have substantially the same construction and function as those of shift register 116. Thus, all the output signals from binary counter 115 are simultaneously latched as the binary signals by shift registers 116, 117 and 118.

The speed signal generator 28b further comprises a three-state-buffer 119 which has a control terminal 119a for receiving an electric signal from a NAND-gate 120 and input terminals for receiving the output signals from shift registers 116, 117 and 118. NAND-gate 120 has input terminals for receiving the I/0 and SEL-3 signals from computer 28c. When both the I/0 and SEL-3 signals are at a high level, NAND-gate 120 generates a low level signal therefrom. When one of the I/0 and SEL-3 signals becomes a low level signal, NAND-gate 120 generates a high level signal therefrom. Upon receiving the low level signal from NAND-gate 120, the three-state-buffer 119 acts to transfer the binary output signals from shift registers 116-118 to the busline of computer 28c. When received the high level signal from NAND-gate 120, the buffer 119 acts to interrupt the computer 28c from shift registers 116-118 due to high impedance at its output terminals.

Figure 5:
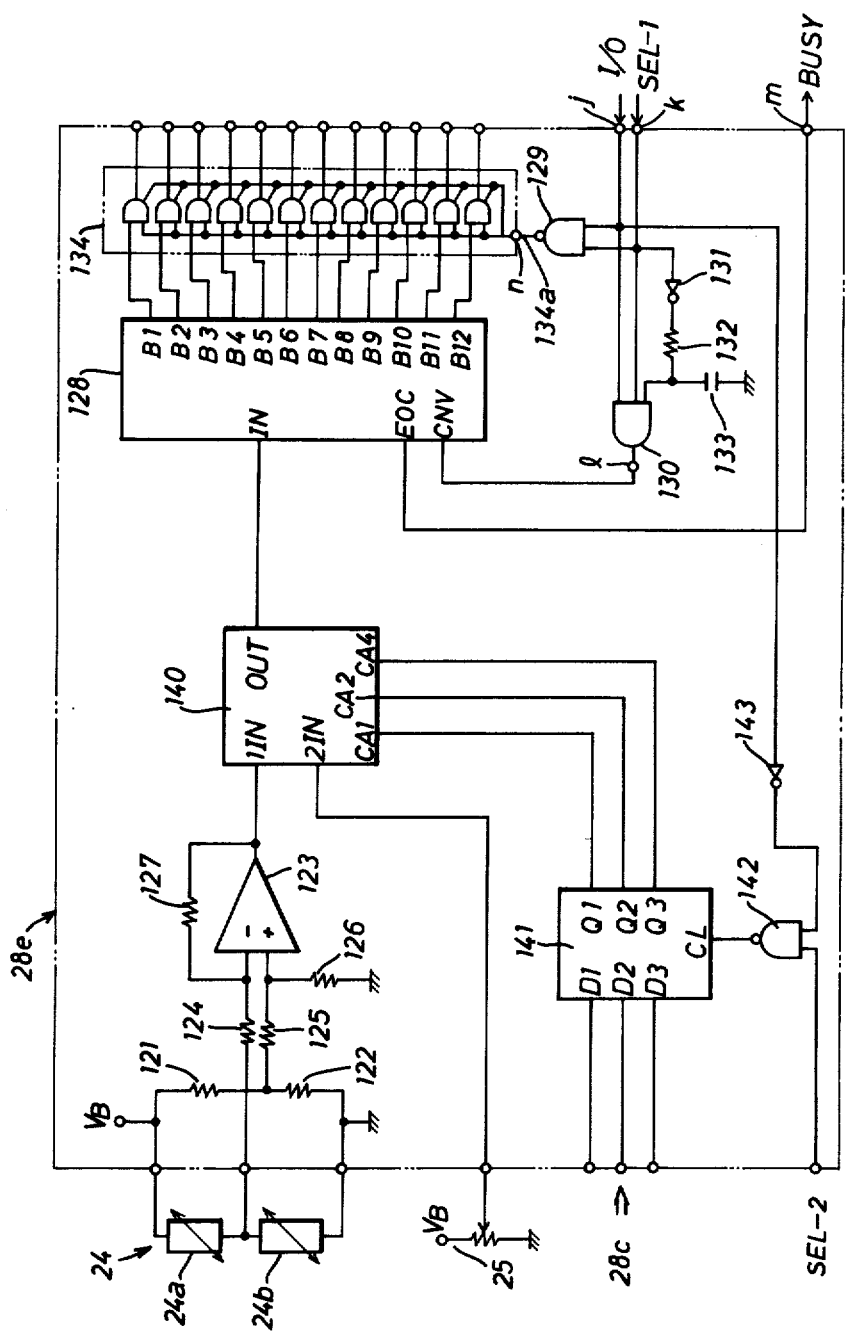
FIG. 5 is a circuit diagram of the analog-to-digital conversion circuit shown in block form in FIG. 2.

In FIG. 5, there is illustrated a preferred embodiment of analog-to-digital conversion circuit 28e which includes resistors 121, 122 connected in the form of a bridge circuit to resistance elements 24a, 24b of negative pressure sensor 24. The resistor 121 and resistance element 24a are applied with the direct current bias voltage $V_B$, while the resistor 122 and resistance element 24b are grounded at one end thereof. Each resistance value of elements 24a, 24b is arranged to change in proportion to the negative pressure in intake manifold 4 of engine 1. An operational amplifier 123 is connected at its negative input terminal to a junction between resistance elements 24a, 24b through a resistor 124 and is connected at its positive input terminal to a junction between resistors 121, 122 through a resistor 125. The operational amplifier 123 is further connected at its negative input terminal with a negative feedback resistor 127 and at its positive input terminal with an earthed resistor 126. In such arrangement, the operational amplifier 123 acts as a differential amplifier to generate an output voltage in proportion to the negative pressure in intake manifold 4.

The analog-to-digital conversion circuit 28e includes an analog multiplexer 140 which is applied at its first input terminal 1IN with the output voltage from operational amplifier 123 and applied at its second input terminal 2IN with the output voltage from valve position sensor 25. The analog multiplexer 140 is arranged to be controlled by a shift register 141 in response to an output signal from a NAND-gate 142. The NAND-gate 142 has a first input terminal for receiving the I/0 signal from DCU of computer 28c through an inverter 143, a second input terminal for receiving the SEL-2 signal from computer 28c, and an output terminal connected to a clock terminal CL of shift register 141. The shift register 141 has input terminals $D_1-D_3$ connected to the bus line of computer 28c and output terminals $Q_1-Q_3$ connected to channel terminals $CA_1-CA_4$. When the binary output signals from analog-to-digital conversion circuit 28e are requested by CPU of computer 28c under the memorized program, the I/O signal becomes a low level signal, and the SEL-2 signal becomes a high level signal. The low level signal I/O is inverted by inverter 143 so that NAND-gate 142 produces a low level signal at its output terminal. When received the low level signal from NAND-gate 142, the shift register 141 is reset to latch binary demand signals from computer 28c. The latched demand signals are applied to the channel terminals $CA_1-CA_4$ of multiplexer 140 to selectively connect the first and second input terminals 1IN, 2IN to an output terminal OUT of multiplexer 140. For instance, when the channel terminals $CA_1-CA_4$ are set in response to the demand signals to be "000", the output voltage from operational amplifier 123 appears at the output terminal OUT. When the channel terminals $CA_1-CA_4$ are set in response to the demand signals to be "001", the output voltage from valve position sensor 25 appears at the output terminal OUT of multiplexer 140.

Figure 6:
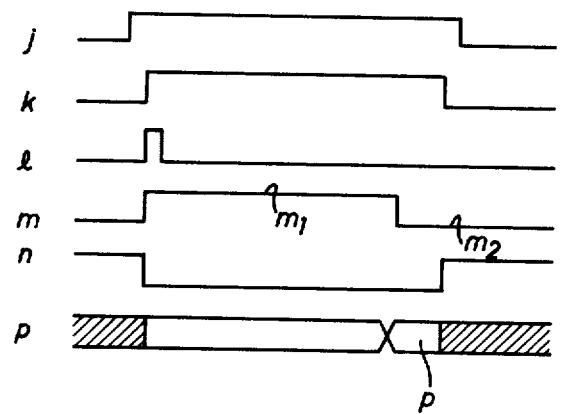
FIG. 6 illustrates waveforms obtained at various points in the circuit diagram of FIG. 5.

The analog-to-digital conversion circuit 28e further includes a successive approximation analog-to-digital converter 128 controlled by an AND-gate 130 and a three-state-buffer 134 controlled by a NAND-gate 129. The AND-gate 130 is provided with first and second input terminals respectively for receiving the I/O and SEL-1 signals from computer 28c and further provided with a third input terminal for receiving the SEL-1 signal through a delay circuit including an inverter 131, a resistor 132 and a condenser 133. When the I/O and SEL-1 signals are respectively high level signals j, k, as shown in FIG. 6, AND-gate 130 produces therefrom an electric pulse signal having a pulsewidth of about 100 nano-seconds. The NAND-gate 129 has input terminals for receiving the I/O and SEL-1 signals from computer 28c. When the I/O and SEL-1 signals are respectively high level signals j, k, NAND-gate 129 produces a low level signal therefrom. When one of the I/O and SEL-signals becomes a low level signal, NAND-gate 129 produces a high level signal therefrom.

The analog-to-digital converter 128 is provided with an input terminal IN for receiving the electric signal from multiplexer 140, a convert-command input terminal CNV for receiving the pulse signal from AND-gate 130, and an end-of-conversion output terminal EOC for applying an electric signal to computer 28c. When AND-gate 130 produces the pulse signal l therefrom, the converter 128 initiates at the leading edge of the pulse signal l to convert the electric signal from multiplexer 140 into a binary signal. Simultaneously, a high level signal $m_1$ appears at the output terminal EOC and is applied as a BUSY signal to DCU of computer 28c. Thus, the computer 28c is ready to read out the binary signals selectively supplied from converter 128 through three-state-buffer 134. During the operation of converter 128, NAND-gate 129 produces a low level signal n therefrom due to the I/O and SEL-signals of high level. When BUSY signal becomes a low level signal $m_2$, the operation of converter 128 ceases, and subsequently the three-state-buffer 134 acts to supply each binary signal from converter 128 to computer 28c in response to the low level signal n from NAND-gate 129 within a period of time indicated by the character p in FIG. 6. When both the I/O and SEL-1 signals become low level signals respectively, high impedance appears at the output terminal of three-state-buffer 134 to electrically disconnect the computer 28c from the analog-to-digital converter 128.

In operation, the computer 28c acts to calculate an optimum opening degree Ld of control valve $V_1$ for effecting recirculation of the exhaust gas in an optimum quantity in accordance with the actual rotational speed of engine 1 and the actual negative pressure in intake manifold 4 by using the binary signals from speed signal generator 28b and analog-to-digital conversion circuit 28e based on the following function (1).

$$Ld = f(Pv, N) \tag{1}$$

where the character Ld is the optimum opening degree of control valve $V_1$, the character Pv is the actual negative pressure in intake manifold 4, and the character N is the actual rotational speed of engine 1. To calculate the optimum opening degree Ld of control valve $V_1$, the following inequalities and equations are stored in ROM of computer 28c.

$$l \cdot \Delta Pv \leq Pv < (l+1) \cdot \Delta Pv \tag{2}$$

$$m \cdot \Delta N \leq N < (m+1) \Delta N \tag{3}$$

$$Ld_1 = \frac{\{(l+1) \cdot \Delta Pv - Pv\} \cdot f(l\Delta PV, m\Delta N)}{\Delta Pv} + \tag{4}$$

$$\frac{(Pv - l \cdot \Delta Pv) \cdot f((l+1)\Delta Pv, m\Delta N)}{\Delta Pv}$$

$$Ld_2 = \frac{\{(l+1)\Delta Pv - Pv\} \cdot f(l \cdot \Delta Pv, (m+1)\Delta N)}{\Delta Pv} + \tag{5}$$

$$\frac{(Pv - l \cdot \Delta Pv) \cdot f((l+1)\Delta Pv, (m+1)\Delta N)}{\Delta Pv}$$

$$Ld = \frac{\{(m+1) \cdot \Delta N - N\} \cdot Ld_1 + (N - m\Delta N) \cdot Ld_2}{\Delta N} \tag{6}$$

where the characters $\Delta Pv$ and $\Delta N$ indicate each value of the negative pressure in intake manufold 4 and the rotational speed of engine 1 in a predetermined scale in relation to an optimum recirculation rate of the exhaust gas.

The computer 28c is also programmed to calculate the displacement speed V of control valve $V_1$ in each energization of electromagnetically operated valves 21, 22 particularly in relation to the actual opening degree Ln of control valve $V_1$, the pressure Pd in servo-chamber 14 of servomotor 10, the actual intake manifold pressure Pv, the capacity M of servo-chamber 14 and each opening area A of electromagnetically operated valves 21, 22. For the purpose of calculating the displacement speed V of control valve $V_1$, the following equations are stored in ROM of computer 28c.

$$\Delta W = \alpha \cdot A \sqrt{2 \cdot g \cdot rp(Pv - Pd)} \tag{7}$$

$$Pd = F1(M, W) \tag{8}$$

$$Ln = F2(Pd) \tag{9}$$

$$V = dLn/dt \tag{10}$$

where $\Delta W$ is mass flow per a unit time, $\alpha$ is a flow quantity coefficient, g is dynamic acceleration, rp is air density, and W is weight of the air in servo-chamber 14. In the case that the atmospheric pressure in servo-chamber 14 is calculated, (Pv−Pd) in the equation (7) may be substituted (Pv−Pa), the character Pa representing the atmospheric pressure.

Figure 7:
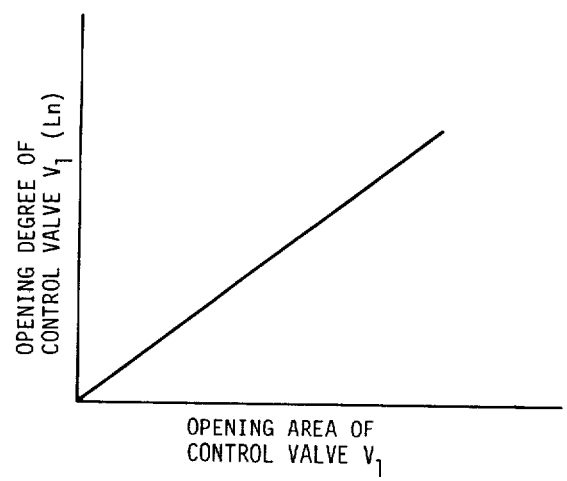
FIG. 7 is a graph showing a relationship between the actual opening degree of the flow control valve in FIG. 1 and the opening area of the flow control valve.

The computer 28c is further programmed to calculate each energization time of electromagnetically operated valves 21, 22 necessary for adjusting the actual opening degree Ln to the calculated optimum value Ld. For the purpose of calculating each energization time of the electromagnetically operated valves 21, 22, the following equation (11) is stored in ROM of computer 28c.

$$T = T_o + K \times |Ld - Ln| \tag{11}$$

where T is the energization time, $T_o$ is a delay time in each energization of valves 21, 22, K is a value of $K\alpha 1/V$, Ld is the optimum opening degree of control valve $V_1$, and Ln is the actual opening degree of control valve $V_1$. As a result of such calculations as described above, the computer 28c acts to produce an output binary signal indicative of the calculated energization time T, and the duty generator 28f acts to convert the output binary signal from computer 28c into a pulse signal for defining each energization time of the electromagnetically operated valves 21, 22, as described in detail later. In this respect, it is noted that the selective energization of valves 21, 22 is effected in dependence upon a relationship between the actual opening degree Ln of control valve $V_1$ and the calculated optimum value Ld. In FIG. 7, there is illustrated a relationship between the actual opening degree Ln of control valve $V_1$ and the opening area of the same valve. As is understood from the relationship of FIG. 7, when the actual opening degree Ln is smaller than the calculated optimum value Ld, the first electromagnetically operated valve 21 is energized to apply the negative pressure from intake manifold 4 into servo-chamber 14 of servo-motor 10. When the actual opening degree Ln is larger than the calculated optimum value Ld, the second electromagnetically operated valve 22 is energized to apply the atmospheric pressure into servo-chamber 14 of servomotor 10.

Figure 8:
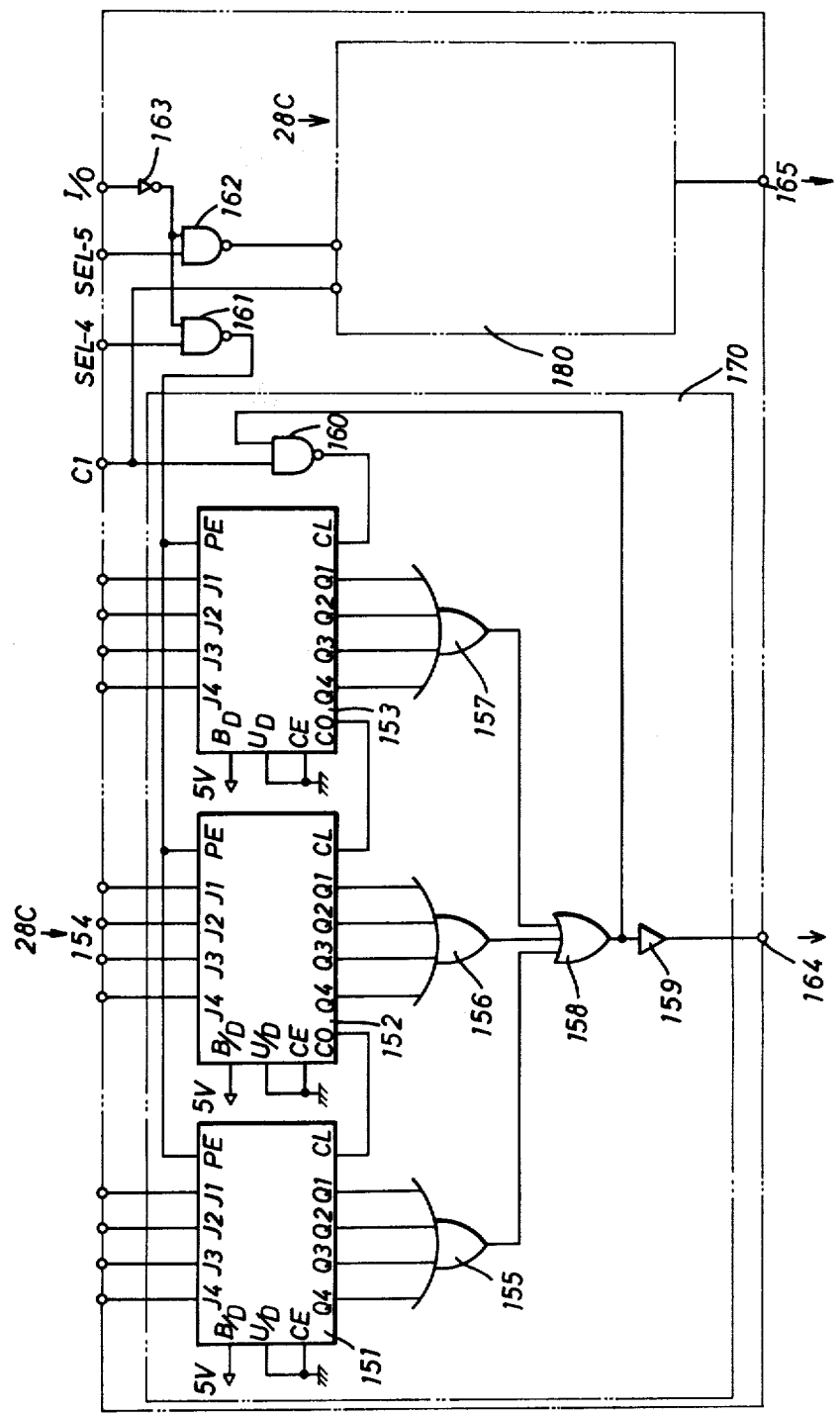
FIG. 8 is a circuit diagram of the duty generator shown in block form in FIG. 2.
Figure 9:
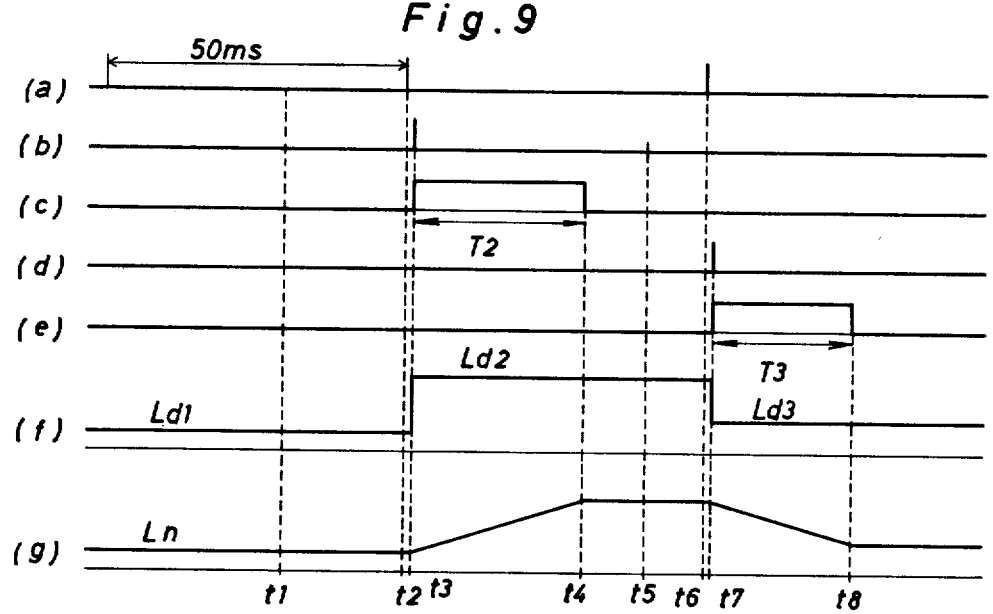
FIG. 9 illustrates pulse signals generated from the duty generator in relation to control of the opening degree of the flow control valve.

In FIG. 8, there is illustrated a preferred embodiment of duty generator 28f which includes a first duty generator 170 for the first electromagnetically operated valve 21 and a second duty generator 180 for the second electromagnetically operated valve 22. The first duty generator 170 includes presettable up-down counters 151, 152, 153, for example of ICCD-4029 type manufactured by RCA Corporation, OR-gates 155-158, a NAND-gate 160 and a buffer 159. In operation of the first duty generator 170, the I/O signal from computer 28c is inverted by an inverter 163 and applied to NAND-gates 161, 162, and fourth and fifth device-select or SEL-4 and 5 signals from computer 28c are respectively applied to NAND-gates 161, 162. NAND-gate 160 is provided with a first input terminal for receiving a series of clock signals $c_1$ of about 64 micro-seconds from clock circuit 28d and a second input terminal connected to the output terminal of OR-gate 158. When NAND-gate 161 is applied with the I/O and SEL-4 signals from computer $28c$, the up-down counters 151-153 act to successively countdown a value of the output binary signal indicative of the calculated energization time for valve 21 from computer $28c$ in accordance with the clock signals $c_1$. Upon completion of the counting down operation in respective counters 151-153, a low level signal appears at the output terminal of OR-gate 158 and is applied to NAND-gate 160 to prohibit the clock signals $c_1$ from clock circuit $28d$. Thus, as shown in FIG. 9, a pulse signal (c) with a pulse width $T_2$ corresponding with the calculated energization time T appears at the output terminal 164 of duty generator 170 and is applied to the drive circuit $28g$. In this preferred embodiment, the construction and function of second duty generator 180 are substantially the same as those of first duty generator 170.

Figure 10:
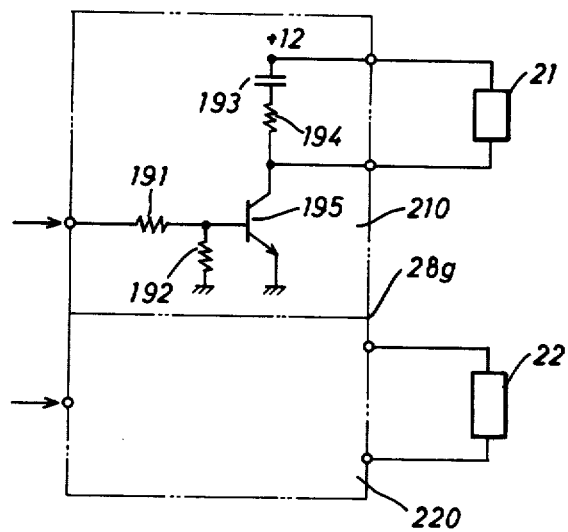
FIG. 10 is a circuit diagram of the drive circuit shown in block form in FIG. 2.

In FIG. 10 there is illustrated a preferred embodiment of the drive circuit $28g$ which includes first and second drive circuits 210 and 220 respectively for the first and second electromagnetically operated valves 21 and 22. The first drive circuit 210 is provided with a transistor 195 of NPN type which is connected at its base to the output terminal 164 of first duty generator 170 through a resistor 191 and grounded at its base through a resistor 192. The transistor 195 is also grounded at its emitter and connected at its collector to a solenoid of the first electromagnetically operated valve 21. The solenoid of valve 21 is connected to a resistor 194 and a condenser 193 for surge voltage absorption. When received the pulse signal (c) from first duty generator 170, the first drive circuit 210 acts to energize the solenoid of valve 21 for the calculated energization time T. In this preferred embodiment, the construction and function of second drive circuit 220 are substantially the same as those of first drive circuit 210. In operation, the second drive circuit 220 acts to energize a solenoid of the second electromagnetically operated valve 22 in response to such a pulse signal (e) from the second duty generator 180 as shown in FIG. 9.

In FIG. 9, the character (a) indicates interruption signals applied to computer $28c$ for executing calculation of the optimum opening degree Ld of control valve $V_1$ and each energization time for valves 21 and 22. Each interruption signal (a) produces as a pulse at a frequency of 50 ms. The character (b) indicates the SEL-4 signal which is applied as a trigger signal to the first duty generator 170, and the character (c) indicates the pulse signal appearing at the output terminal of first duty generator 170. The pulse signal (c) is applied to the first drive circuit 210 to energize the first electromagnetically operated valve 21 thereby to apply the intake manifold negative pressure into the servo-chamber 14 of servomotor 10. The character (d) indicates the SEL-5 signal which is applied as a trigger signal to the second duty generator 180, and the character (e) indicates the pulse signal appearing at the output terminal 165 of second duty generator 180. The pulse signal (e) is applied to the second drive circuit 220 to energize the second electromagnetically operated valve 22 thereby to apply the atmospheric pressure into the servo-chamber 14 of servomotor 10. The character (f) indicates the optimum opening degree Ld of control valve $V_1$ which is calculated by computer $28c$ in response to the interruption signal (a), and the character (g) indicates the actual opening degree Ln of control valve $V_1$ under control of the first and second electromagnetically operated valves 21 and 22.

Hereinafter, operation of the EGR system will be described in accordance with the lapse of time particularly with reference to FIG. 9. Assuming that there occur change of the operating conditions of engine 1 at a time $t_1$ in FIG. 9, the optimum opening degree Ld of control valve $V_1$ under such condition is calculated as a value $Ld_2$ by computer $28c$ in response to the interruption signal (a) at a time $t_2$ in FIG. 9. In this instance, the value $Ld_2$ is calculated to be larger than the previously calculated optimum value $Ld_1$, and the computer $28c$ acts to calculate an energization time T of the first electromagnetically operated valve 21 necessary for adjusting the actual opening degree Ln to the calculated optimum value $Ld_2$ and to produce therefrom an output binary signal indicative of the calculated energization time T. At a time $t_3$, the first duty generator 170 acts in response to the I/O and SEL-4 signals from computer $28c$ to convert the output binary signal into a pulse signal (c) for defining the energization time T of the first electromagnetically operated valve 21. Thus, the first drive circuit 210 is applied with the pulse signal (c) to energize the solenoid of valve 21 for a period of time defined by the pulse width $T_2$ of pulse signal (c), and the servo-chamber 14 of servomotor 10 is applied with the negative pressure through valve 21 to adjust the opening degree of control valve $V_1$. This results in adjustment of the actual opening degree Ln of control valve $V_1$ toward the optimum value $Ld_2$ during the lapse of time from $t_3$ to $t_4$.

Assuming that there occur further change of the operating conditions of engine 1 at a time $t_5$ in FIG. 9, the optimum opening degree Ld of control valve $V_1$ is calculated as a value $Ld_3$ by computer $28c$ in response to the nest interruption signal (a) at a time $t_6$. In this instance, the value $Ld_3$ is calculated to be smaller than the prior optimum value $Ld_2$, and the computer $28c$ acts to calculate an energization time T of the second electromagnetically operated valve 22 necessary for adjusting the actual opening degree Ln to the calculated optimum value $Ld_3$ and to produce therefrom an output binary signal indicative of the calculated energization time T. At a time $t_7$, the second duty generator 180 acts in response to the I/O and SEL-5 signals from computer $28c$ to convert the output signal into a pulse signal (e) for defining the energization time T of the second electromagnetically operated valve 22. Thus, the second drive circuit 220 is applied with the pulse signal (e) to energize the solenoid of valve 22 for a period of time defined by the pulse width $T_3$ of pulse signal (e), and the servo-chamber 14 of servomotor 10 is applied with the atmospheric pressure through valve 22 to adjust the opening degree of control valve $V_1$. This results in adjustment of the actual opening degree Ln of control valve $V_1$ to the optimum value $Ld_3$ during the lapse of time from $t_7$ to $t_8$. In such control, both the electromagnetically operated valves 21 and 22 are deactivated after adjustment of the actual opening degree of control valve $V_1$ to maintain the pressure in servo-chamber 14 of servomotor 10 at a constant level. This serves to maintain the control valve $V_1$ in its adjusted position without any undesirable fluctuation and to minimize each operation of valves 21, 22. It is also apparent that undesirable hunting phenomena may be eliminated by provision of appropriate non-sensitive regions above and below the optimum opening degree of control valve $V_1$.

Figure 11:
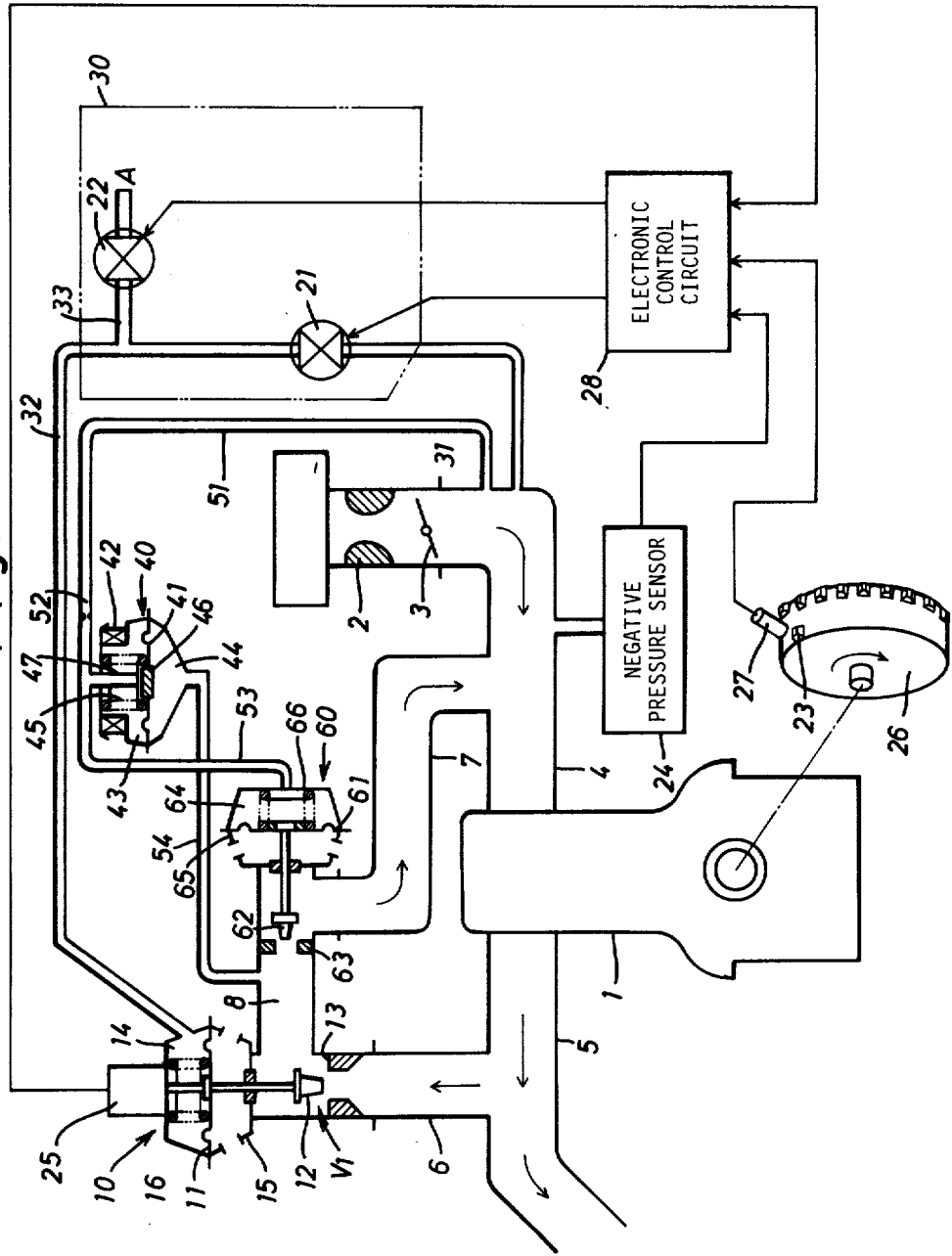
FIGS. 11 and 12 illustrate another application of the present invention.

As is illustrated in FIG. 11, the above-described embodiment may be adapted to another type of exhaust gas recirculation system which includes a pressure regulator 40 and a gas flow controller 160 assembled with recirculation pipe 7 of FIG. 1, the other construction and components being substantially the same as those of the EGR system shown in FIG. 1. In this application, the pressure regulator 40 has a diaphragm member 41 assembled within a housing to form an atmospheric chamber 43 and an exhaust gas chamber 44. The diaphragm member 41 includes a valve member 46 centrally fixed thereto and is biased by a compression spring 45 toward the exhaust gas chamber 44. The exhaust gas chamber 44 is in open communication with recirculation pipe 7 through a conduit 54, while the atmospheric chamber 43 is vented through an air cleaner 42 and connected through a pipe 47 to conduits 51 and 53. The pipe 47 is provided at its open end with a valve seat which cooperates with the valve member 46 to provide a pressure regulator valve. The conduit 51 is provided therein with an orifice 52 and is connected at its one end to the intake manifold 4 at the downstream of throttle valve 3, while the conduit 53 is connected to the gas flow controller 60. The opening degree of the regulator valve is controlled by the biasing force of spring 45 and a difference in pressure between chambers 43 and 44.

The gas flow controller 60 includes a diaphragm member 61 assembled within a housing to form a variable pressure chamber 64 and an atmospheric chamber 65. The diaphragm member 61 includes a piston rod 61a centrally fixed thereto and is biased by a compression spring 66 toward the atmospheric chamber 65. The atmospheric chamber 65 is vented, while the variable pressure chamber 64 is connected to the intake manifold 4 through conduit 53, orifice 52 and conduit 51. The gas flow controller 60 is provided with a gas flow control valve which is located within recirculation pipe 7 and includes a valve member 62 fixed to piston rod 61a and a valve seat 63 secured to the inner wall of recirculation pipe 7. The opening degree of the gas flow control valve is controlled by the biasing force of spring 66 and a difference in pressure between chambers 64 and 65.

In operation of the exhaust gas recirculation system described above, when the pressure in chamber 44 of regulator 40 reaches a predetermined value, the valve of regulator 40 is closed against the biasing force of spring 45 so that only the intake manifold negative pressure is applied to the variable pressure chamber 64 of gas flow controller 60 through conduits 53, 51 under throttling effect of orifice 52. Then, the control valve of gas flow controller 60 is opened against the biasing force of spring 66, and subsequently the opening degree of the gas flow control valve is adjusted in response to open and close of the valve of regulator 40. As a result, the pressure in a space between the control valve $V_1$ and the gas flow control valve is maintained at a constant level.

Figure 12:
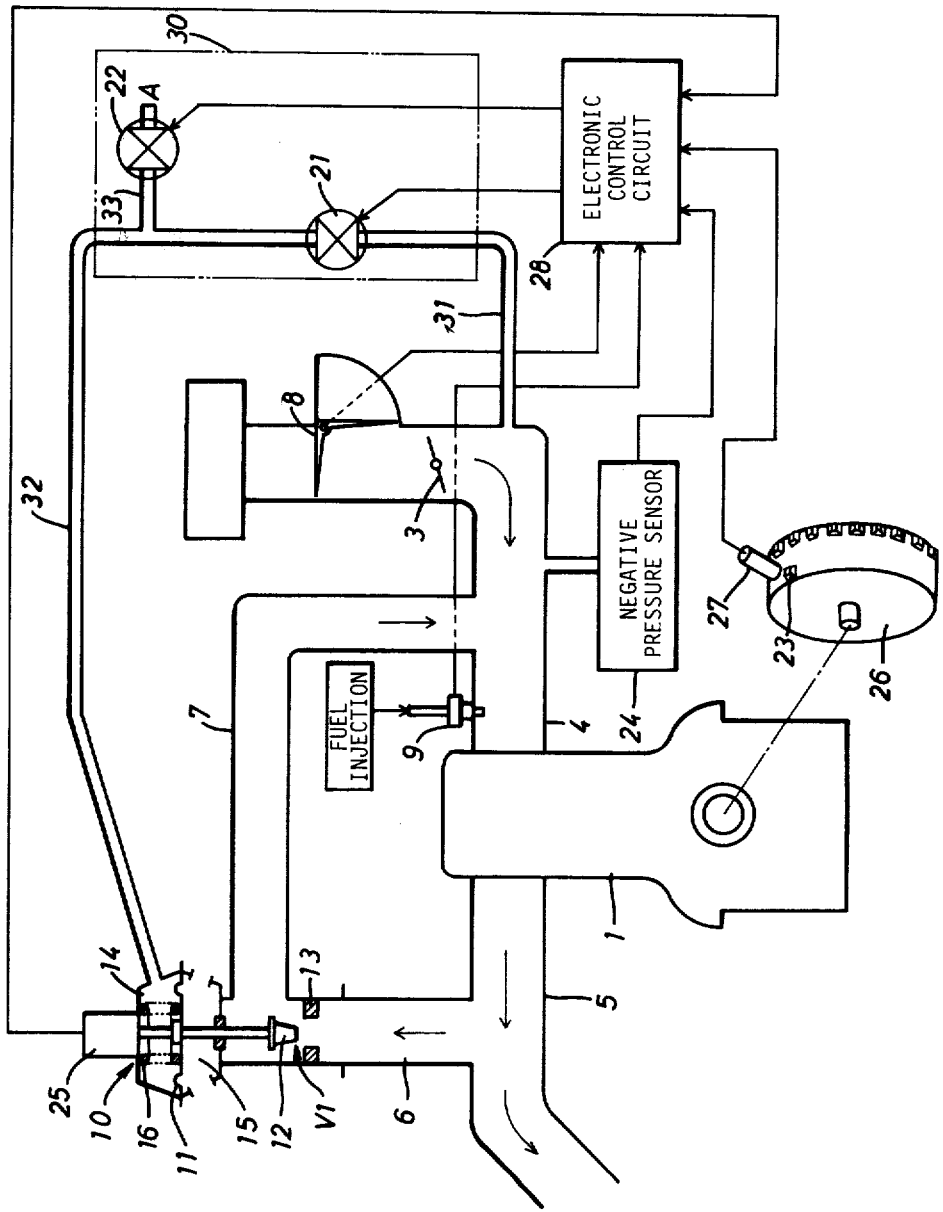

In another application, it is also noted that the present invention may be adapted to such an exhaust gas recirculation system as illustrated in FIG. 12. In this system, the carburetor 2 of FIG. 1 is replaced with an electrically operated fuel injection valve 9 arranged to be controlled by the electronic control circuit 28 of FIG. 1, and an air flow meter 8 is provided to detect a quantity of the intake air so as to apply an electric signal indicative of the actual quantity of the intake air to the electronic control circuit 28. The other construction and function of this system are substantially the same as those of the EGR system illustrated in FIG. 1.

Figure 13:
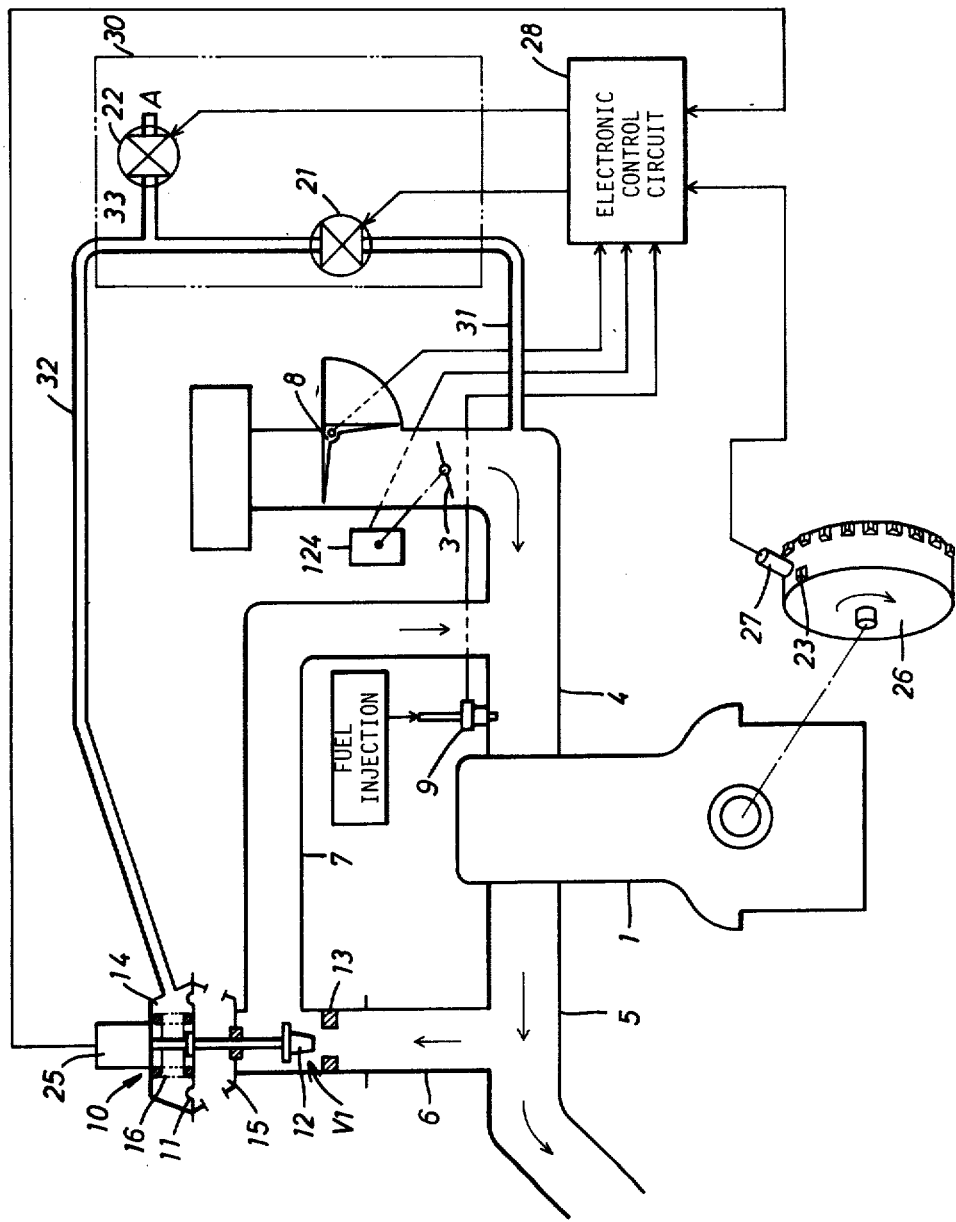
FIG. 13 is a schematic block diagram of a modification of the exhaust gas recirculation system.

In FIG. 13 there is illustrated a modification of the EGR system of FIG. 1 in which the carburetor 2 is replaced with an electrically operated fuel injection valve 9 under control of the electronic control circuit 28 and in which the electronic control circuit 28 is modified to calculate the optimum opening degree of control valve $V_1$ for effecting recirculation of the exhaust gas in an optimum quantity in accordance with the actual rotational speed of engine 1 and the actual quantity of the intake air and to compensate the calculated optimum value in accordance with decrease of the exhaust gas recirculation rate caused by clogging or obstruction in recirculation pipes 6, 7 and/or control valve assembly $V_1$. For the purpose of effecting such function of the electronic control circuit 28, an air flow meter 8 in the form of a potentiometer is provided within the air induction passage to produce an electric signal indicative of the actual quantity of the intake air, and a throttle position sensor 124 is provided to produce an electric signal indicative of the actual opening degree of throttle valve 3, provided that the negative pressure sensor 24 of FIG. 1 is replaced with the air flow meter 8.

Figure 14:
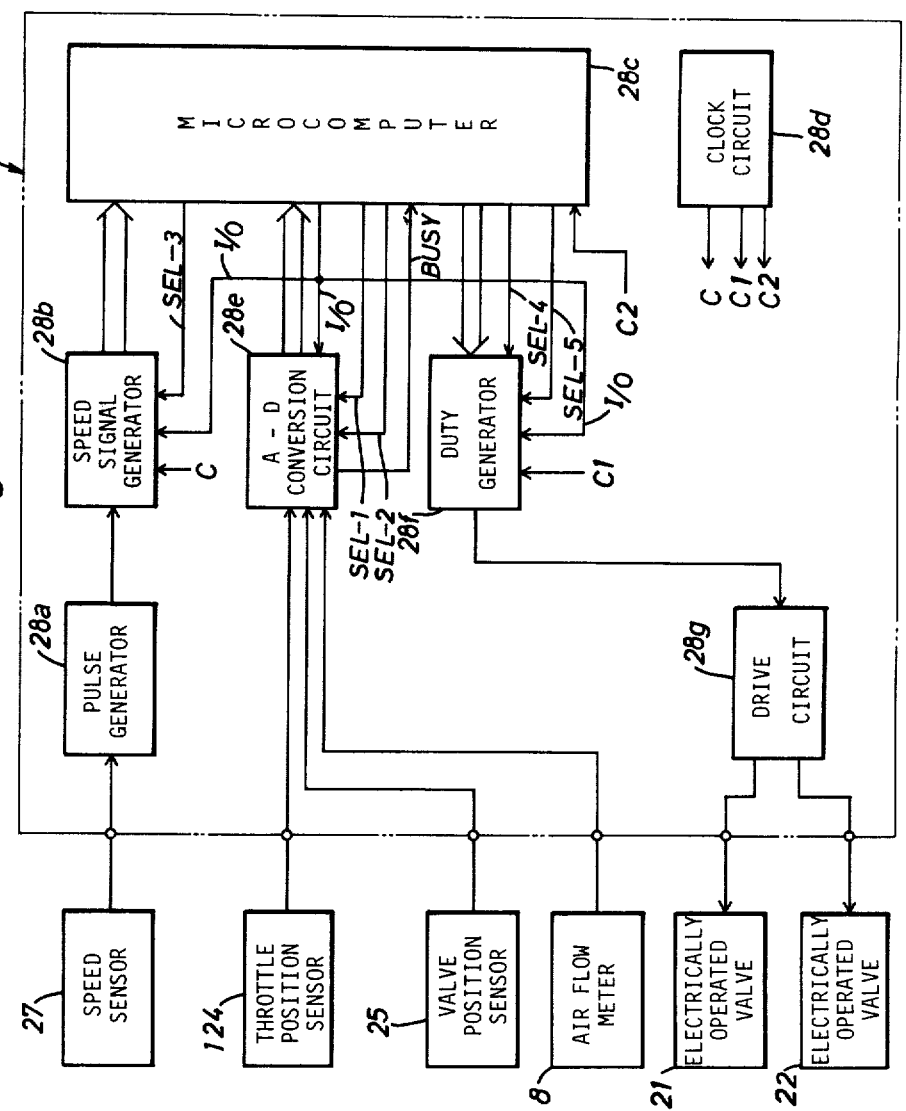
FIG. 14 is a circuit diagram in block form of the electronic control circuit shown in FIG. 13.
Figure 15:
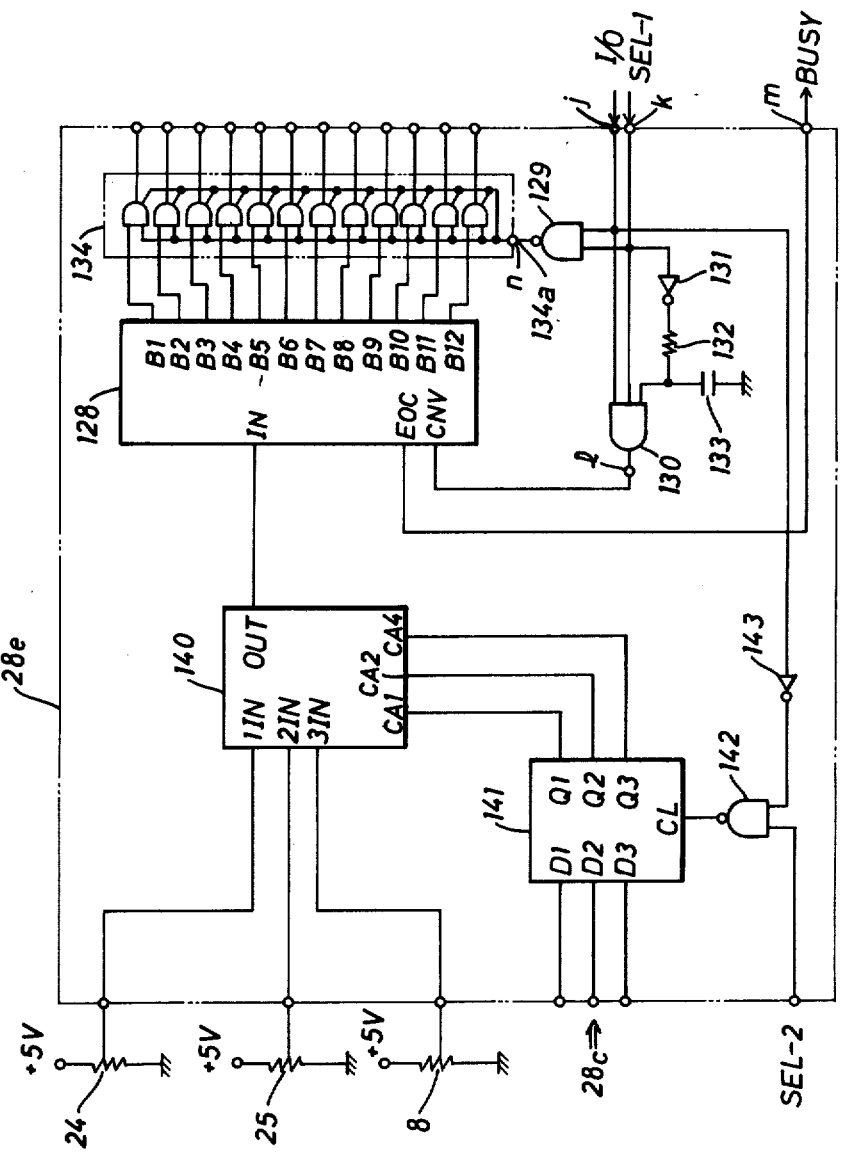
FIG. 15 is a circuit diagram of the analog-to-digital conversion circuit shown in block form in FIG. 14.

As is illustrated in FIGS. 14 and 15, the output voltages for sensors 124, 25 and 8 are applied to the analog-to-digital conversion circuit 28e in which the demand signals from shift register 141 are applied to the channel terminals $CA_1$–$CA_4$ of multiplexer 140 to selectively connect the first, second and third input terminals 1IN, 2IN and 3IN to the output terminal OUT of multiplexer 140. For instance, when the channel terminals $CA_1$–$CA_4$ are set in response to the demand signals to be "000", the output voltage from throttle position sensor 124 appears at the output terminal OUT. When the channel terminals $CA_1$–$CA_4$ are set in response to the demand signals to be "001", the output voltage from valve position sensor 25 appears at the output terminal OUT of multiplexer 140. When the channel terminals $CA_1$–$CA_4$ are set in response to the demand signals to be "010", the output voltage from air flow meter 8 appears at the output terminal OUT of multiplexer 140.

In this modification, the computer 28c is programmed to calculate the optimum opening degree $Ld$ of control valve $V_1$ in accordance with the actual rotational speed $N$ of engine 1 and the actual quantity of the intake air per one rotation of engine 1 $Qa/N$ by using the binary signals from speed signal generator 28b and analog-to-digital conversion circuit 28e based on the following function (1a).

$$Ld = f(Qa/N, N) \tag{1a}$$

To calculate the optimum opening degree $Ld$ of control valve $V_1$ the following inequalities and equations are stored in ROM of computer 28c.

$$l \cdot \Delta Qa/N \leq Qa/N < (l+1) \cdot \Delta Qa/N \tag{2a}$$

$$m \cdot \Delta N \leq N < (m+1)\Delta N \tag{3a}$$

$$Ld_1 = \frac{\{(l+1) \cdot \Delta Qa/N - Qa/N\} \cdot f(l \Delta Qa/N, m\Delta N)}{\Delta Qa/N} + \frac{(Qa/N - l \cdot \Delta Qa/N) \cdot f\{(l+1)\Delta Qa/N, m\Delta N\}}{\Delta Qa/N} \tag{4a}$$

$$Ld_2 = \frac{\{(l+1)\Delta Qa/N - Qa/N\} \cdot f\{l \cdot \Delta Qa/N, (m+1)\Delta N\}}{\Delta Qa/N} + \tag{5a}$$

-continued
$$\frac{(Qa/N - l \cdot \Delta Qa/N) \cdot f\{(l + 1)\Delta Qa/N, (m + 1)\Delta N\}}{\Delta Qa/N}$$

$$Ld = \frac{\{(m + 1) \cdot \Delta N - N\} \cdot Ld_1 + (N - m\Delta N) \cdot Ld_2}{\Delta N} \quad (6a)$$

where the characters $\Delta Qa/N$ and $\Delta N$ indicate each value of the actual quantity of the intake air per one rotation of the engine and the rotational speed of the engine in a predetermined scale in relation to an optimum recirculation rate of the exhaust gas.

Figure 16:
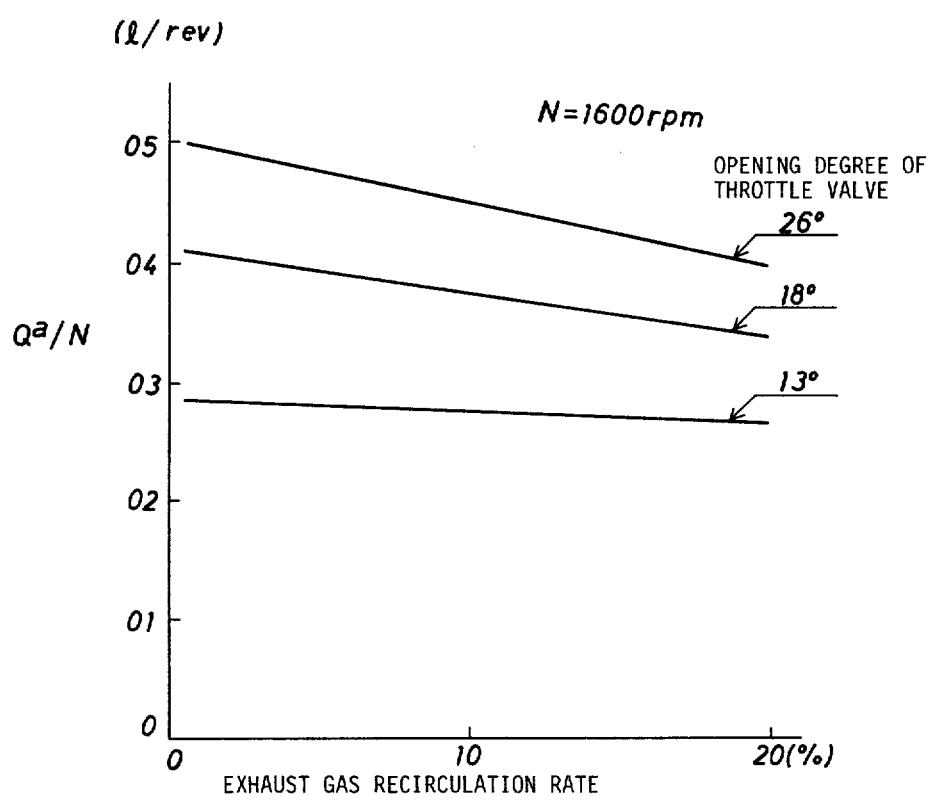
FIG. 16 is a graph showing a relationship between the quantity of the intake air per one rotation of the engine and the exhaust gas recirculation rate in consideration with throttle opening degrees.

To discriminate the presence of clogging or obstruction in recirculation pipes 6, 7 and/or control valve $V_1$ caused by adherence of carbon and lead contents or the like and to compensate the calculated optimum opening degree Ld of control valve $V_1$ in accordance with the extent of clogging or obstruction, the inventors have found the fact that a relationship between the flow quantity Qa/N of the intake air per one rotation of engine 1 and the exhaust gas recirculation rate is determined in consideration with each opening degree of throttle valve 3 in operation of engine 1 at a speed of for example 1600 rpm under the normal condition of recirculation pipes 6, 7 and control valve assembly $V_1$ without any clogging or obstruction, as is illustrated in FIG. 16. For the purpose of compensating the calculated optimum opening degree Ld of control valve $V_1$ in accordance with the extent of clogging or obstruction, each opening degree Qd of throttle valve 3 related to each flow quantity Qa/N of the intake air per one rotation of engine 1 and each rotational speed N of engine 1 in relation to the calculated optimum value Ld is experimentally determined and stored in ROM of computer 28c to discriminate a difference between the value of Qd and the actual opening degree $\theta$ of throttle valve 3. Furthermore, each compensation value is experimentally determined in accordance with the difference between the values of Qd and $\theta$, which is stored in ROM of computer 28c to compensate the calculated optimum opening degree Ld in accordance with the discriminated difference Qd $-\theta$.

Thus, the computer 28c is programmed to calculate each energization time of electromagnetically operated valves 21, 22 necessary for adjusting the actual opening degree Ln of control valve $V_1$ to the compensated optimum value, as is previously described in detail in the embodiment of FIG. 1. In operation, the computer 28c acts to produce an output binary signal indicative of the calculated energization time T on a basis of the compensated optimum value, and the duty generator 28f acts to convert the output binary signal from computer 28c into a pulse signal for defining each energization time of the electromagnetically operated valves 21, 22. This serves to ensure recirculation of the exhaust gas in the optimum quantity in accordance with operating conditions of engine 1 without undesired influence caused by clogging or obstruction in recirculation pipes 6, 7 and/or control valve assembly $V_1$. In this respect, it is noted that in this modification, the selective energization of valves 21, 22 is effected in dependence upon a relationship between the actual opening degree Ln of control valve $V_1$ and the pressure in servo-chamber 14 of servomotor 10 shown in FIG. 17. The other construction and function are substantially the same as those in the embodiment of FIG. 1.

In another modification wherein the throttle position sensor 124 is replaced with the negative pressure sensor of FIG. 1, such compensation of the calculated optimum opening degree Ld of control valve $V_1$ as described above may be executed by computer 28c as follows. In this case, as is illustrated in FIG. 18, a relationship between the flow quantity Qa/N of the intake air per one rotation of engine 1 and the exhaust gas recirculation rate is determined in consideration with each negative pressure in intake manifold 4 in operation of engine 1 at a speed of, for example, 1600 rpm under the normal condition of recirculation pipes 6, 7 and control valve assembly $V_1$ without any clogging or obstruction. For the purpose of compensating the calculated optimum opening degree Ld of control valve $V_1$ in accordance with the extent of clogging or obstruction, each negative pressure $P_B$ in intake manifold 4 related to each flow quantity Qa/N of the intake air per one rotation of engine 1 and each rotational speed N of engine 1 in relation to the calculated optimum value Ld is experimentally determined and stored in ROM of computer 28c to discriminate a difference between the value of $P_B$ and the actual negative pressure $P_b$ in intake manifold 4. Furthermore, each compensation value is experimentally determined in accordance with the difference between the values of $P_B$ and $P_b$, which is stored in ROM of computer 28c to compensate the calculated optimum opening degree Ld in accordance with the discriminated difference $P_B$-$P_b$. Thus, the computer 28c is programmed to calculate each energization time of the electromagnetically operated valves 21, 22 necessary for adjusting the actual opening degree Ln of control valve $V_1$ to the compensated optimum value, as is previously described.

Figure 19:
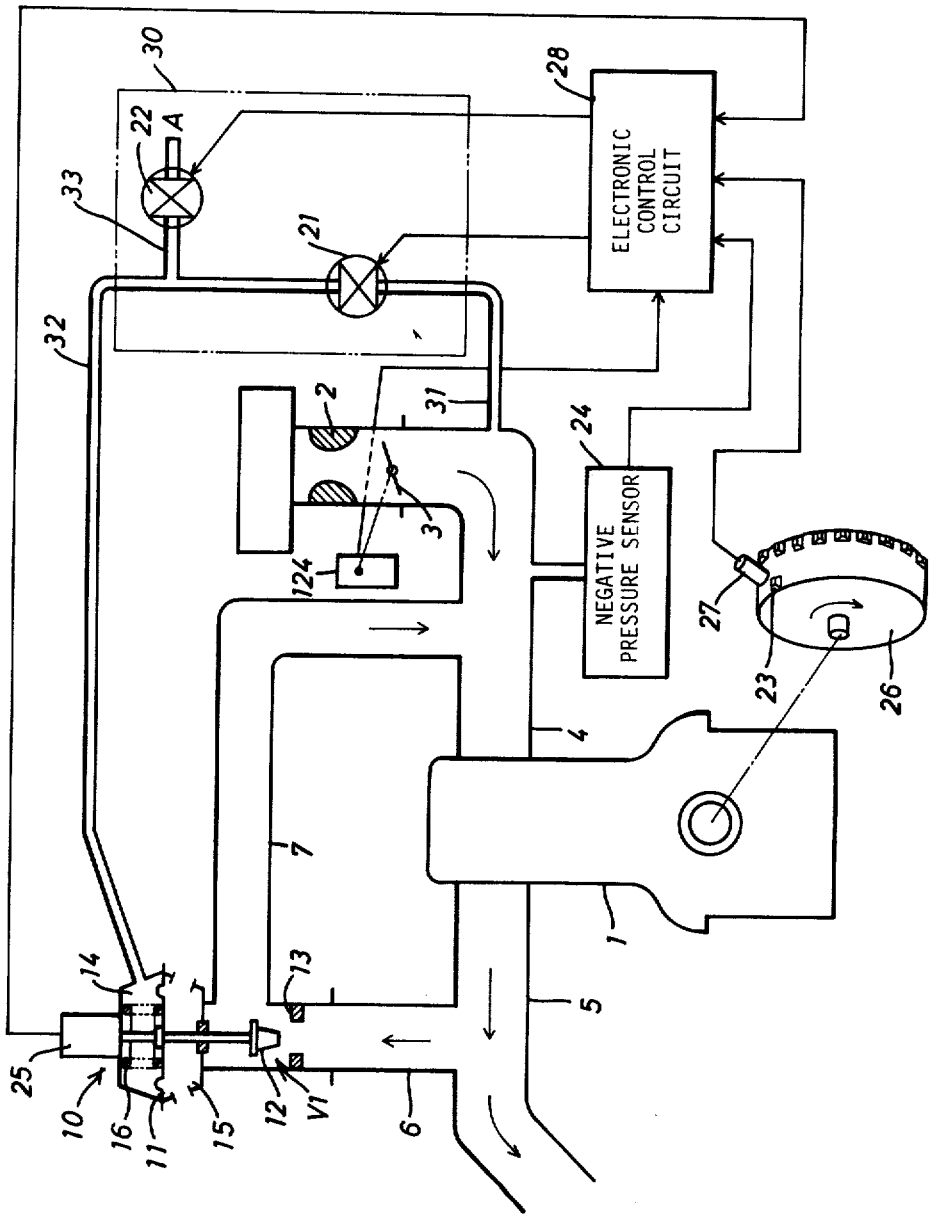
FIG. 19 is a schematic block diagram of another modification of the exhaust gas recirculation system.
Figure 20:
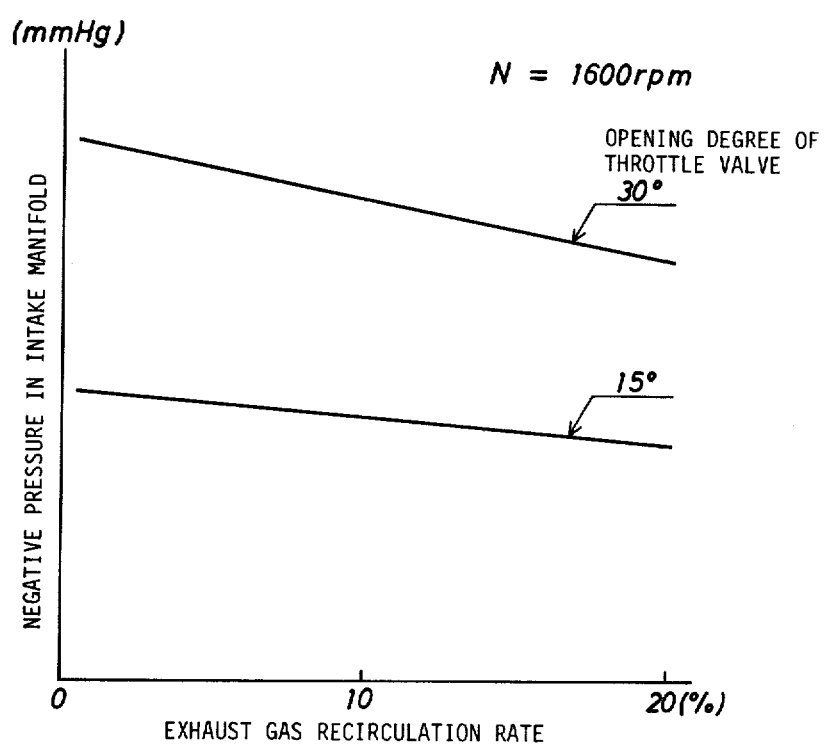
FIG. 20 is a graph showing a relationship between the negative pressure in the intake manifold and the exhaust gas recirculation rate in consideration with throttle opening degrees of the engine.

In FIG. 19 there is illustrated another modification of the EGR system of FIG. 1 in which a throttle position sensor 124 is provided to produce an electric signal indicative of the actual opening degree of throttle valve 3 and in which the electronic control circuit 28 is arranged to calculate the optimum opening degree of control valve $V_1$ for effecting recirculation of the exhaust gas in an optimum quantity in accordance with the actual rotational speed of engine 1 and the actual negative pressure in intake manifold 4 and to compensate the calculated optimum value in accordance with decrease of the exhaust gas recirculation rate caused by clogging or obstruction in recirculation pipes 6, 7 and/or control valve assembly $V_1$. For the purpose of effecting such compensation of the calculated optimum opening degree Ld of control valve $V_1$ as described above, as is illustrated in FIG. 20, a relationship between the negative pressure in intake manifold 4 and the exhaust gas recirculation rate may be determined in consideration with each opening degree of throttle valve 3 in operation of engine 1 at a speed of, for example, 1600 rpm under the normal condition of recirculation pipes 6, 7 and control valve assembly $V_1$ without any clogging or obstruction. In this case, each opening degree Qd of throttle valve 3 related to each negative pressure in intake manifold 4 and each rotational speed N of engine 1 in relation to the calculated optimum value Ld is experimentally determined and stored in ROM of computer 28c to discriminate a difference between the value of Qd and the actual opening degree $\theta$ of throttle valve 3. Additionally, each compensation value is experimentally determined in accordance with the difference between the values of Qd and $\theta$, which is stored in ROM of computer 28c to compensate the calculated optimum opening degree Ld of control valve $V_1$ in accordance with the discriminated difference $Q_d$–$\theta$. Thus, the computer 28c is programmed to calculate each energization time of the electromagnetically operated valves 21, 22 necessary for adjusting the actual opening degree Ln of control valve $V_1$ to the compensated optimum value, as is previously described.

Although certain specific embodiments of the invention have been shown and described, it is obvious that many modifications thereof are possible. The invention, therefore, is not intended to restricted to the exact showing of the drawings and description thereof, but is considered to include reasonable and obvious equivalents.

What is claimed is:

1. An exhaust gas recirculation system for an internal combustion engine having a recirculation passage to provide a communication between an intake pipe and an exhaust pipe of said engine, a pneumatic servomotor to be operated by the pressure applied to its servo-chamber, flow control valve means associated with said servomotor for controlling the quantity of exhaust gas flowing through said recirculation passage in accordance with the level of pneumatic pressure in the servo-chamber of said servomotor, and first and second electrically operated valves to selectively apply negative pressure and the atmospheric pressure respectively from said intake pipe and the exterior to the servo-chamber of said servomotor in energization thereof and to maintain the level of pneumatic pressure in the servo-chamber at an adjusted value during deenergization thereof, said recirculation system comprising:

first detecting means for producing a first electric signal indicative of operating conditions of said engine;

second detecting means for producing a second electric signal indicative of the actual opening degree of said flow control valve means;

computer means to calculate a desired opening degree of said flow control valve means in response to said first electric signal for effecting recirculation of the exhaust gas in a desired quantity in accordance with the operating conditions of said engine, to calculate each energization time of said valves defined by a difference between the actual opening degree of said flow control valve means and the calculated value in response to the second electric signal, and to generate an output signal indicative of the calculated energization time; and means for selectively energizing said valves in response to the output signal from said computer means for the calculated energization time and for deenergizing both said valves upon lapse of the calculated energization time.

2. An exhaust gas recirculation system as set forth in claim 1, wherein said computer means is programmed to calculate a displacement speed of said flow control valve means in each energization of said valves in relation to the actual opening degree of said flow control valve means, the pneumatic pressure in the servo-chamber of said servomotor, the capacity of the servo-chamber and each opening area of said valves so as to calculate each energization time of said valves on a basis of the calculated displacement speed of said flow control valve means.

3. An exhaust gas recirculation system as set forth in claim 2, wherein said computer means is programmed to calculate each energization time of said valves further in consideration with a delay time in each energization of said valves.

4. An exhaust gas recirculation system as set forth in claim 1, wherein said computer means is programmed to calculate each energization time of said electrically operated valves on a basis of the following equation:

$$T = T_o + K \times 1Ld - Ln1$$

where T is the energization time, $T_o$ is a delay time in each energization of said valves, K is a value of $K\alpha 1/V$, Ld is the desired opening degree of said flow control valve means, and Ln is the actual opening degree of said flow control valve means, and where V is a displacement speed of said flow control valve means in each energization of said valves.

5. An exhaust gas recirculation system as set forth in claim 4, wherein said computer means is programmed to calculate the displacement speed V of said flow control valve means on a basis of the following equations:

$$\Delta W = \alpha \cdot A \sqrt{2 \cdot g \cdot rp(Pv - Pd)}$$

$$Pd = F1(M, W)$$

$$Ln = F2(Pd)$$

$$V = dLn/dt$$

where $\Delta W$ is mass flow per a unit time, $\alpha$ is a flow quantity coefficient, g is dynamic acceleration, rp is air density, W is weight of the air in the servo-chamber of said servo-motor, A is each opening area of said valves, Pv is the pressure in said intake pipe, Pd is the pressure in the servo-chamber, and M is the capacity of the servo-chamber.

6. An exhaust gas recirculation system as set forth in claim 1, wherein the selective energization of said valves is effected in dependence upon a relationship between the actual opening degree of said flow control valve means and the calculated value.

7. An exhaust gas recirculation system as set forth in claim 1, 2 or 3, wherein said means for selectively energizing said valves includes a duty generator for converting the output signal from said computer means into a pulse signal for defining each energization time of said valves, and a drive circuit for controlling each energization of said valves in accordance with a pulse width of the pulse signal from said duty generator.

8. An exhaust gas recirculation system as set forth in claim 1, wherein said first detecting means includes speed detecting means for producing an electric signal indicative of the rotational speed of said engine and negative pressure detecting means for producing an electric signal indicative of the negative pressure in said intake pipe, and wherein said computer means is programmed to calculate a desired opening degree of said flow control valve means in response to electric signals from said speed detecting means and said negative pressure detecting means for effecting recirculation of the exhaust gas in a desired quantity in accordance with the rotational speed of said engine and the negative pressure in said intake pipe.

9. An exhaust gas recirculation system as set forth in claim 1, wherein said first detecting means includes speed detecting means for producing an electric signal indicative of the rotational speed of said engine and air flow detecting means for producing an electric signal indicative of the quantity of intake air, and wherein said computer means is programmed to calculate a desired opening degree of said flow control valve means in response to the electric signals from said speed detecting means and said air flow detecting means for effecting recirculation of the exhaust gas in a desired quantity in accordance with the rotational speed of said engine and the quantity of intake air per one rotation of said engine.

10. An exhaust gas recirculation system as set forth in claim 8, further comprising a throttle position sensor for producing an electric signal indicative of the actual opening degree of a throttle valve of said engine, and wherein said computer means is arranged to memorize each opening degree of said throttle valve related to each negative pressure in said intake pipe and each rotational speed of said engine in relation to the calculated opening degree of said flow control valve means, said computer means being programmed to discriminate a difference between the memorized negative pressure and the value of said electric signal from said throttle position sensor and to compensate the calculated opening degree in accordance with the discriminated difference.

11. An exhaust gas recirculation system as set forth in claim 9, further comprising a throttle position sensor for producing an electric signal indicative of the actual opening degree of a throttle valve of said engine, and wherein said computer means is arranged to memorize each opening degree of said throttle valve related to each flow quantity of the intake air per one rotation of said engine and each rotational speed of said engine in relation to the calculated opening degree of said flow control valve means, said computer means being programmed to discriminate a difference between the memorized opening degree of said throttle valve and the value of said electric signal from said throttle position sensor and to compensate the calculated opening degree in accordance with the discriminated difference.

12. An exhaust gas recirculation system as set forth in claim 9, further comprising negative pressure detecting means for producing an electric signal indicative of the actual negative pressure in said intake pipe, and wherein said computer means is arranged to memorize each negative pressure in said intake pipe related to each flow quantity of the intake air per one rotation of said engine and each rotational speed of said engine in relation to the calculated opening degree of said flow control valve means, said computer means being programmed to discriminate a difference between the memorized negative pressure and the value of said electric signal from said negative pressure detecting means and to compensate the calculated opening degree in accordance with the discriminated difference.

* * * * *